United States Patent
Froehlich et al.

(10) Patent No.: US 8,425,855 B2
(45) Date of Patent: Apr. 23, 2013

(54) REACTOR WITH SILICIDE-COATED METAL SURFACES

(76) Inventors: Robert Froehlich, New Providence, NJ (US); Ben Fieselmann, Bridgewater, NJ (US); David Mixon, Port Murray, NJ (US); York Tsuo, Livingston, NJ (US)

(*) Notice: Subject to any disclaimer, the term of this patent is extended or adjusted under 35 U.S.C. 154(b) by 0 days.

(21) Appl. No.: 12/763,734

(22) Filed: Apr. 20, 2010

(65) Prior Publication Data
US 2010/0266466 A1    Oct. 21, 2010

Related U.S. Application Data

(60) Provisional application No. 61/170,962, filed on Apr. 20, 2009.

(51) Int. Cl.
| B01J 19/02 | (2006.01) |
| B01J 8/18 | (2006.01) |
| C01B 33/03 | (2006.01) |

(52) U.S. Cl.
USPC ............ 422/240; 422/241; 422/139; 423/348

(58) Field of Classification Search .................. 422/139, 422/240, 241; 423/348
See application file for complete search history.

(56) References Cited

U.S. PATENT DOCUMENTS

| 3,719,519 A | 3/1973 | Perugini |
| 3,906,605 A | 9/1975 | McLain |
| 4,084,024 A | 4/1978 | Schumacher |
| 4,134,514 A | 1/1979 | Schumacher |
| 4,140,735 A | 2/1979 | Schumacher |
| 4,227,291 A | 10/1980 | Schumacher |
| 4,298,037 A | 11/1981 | Schumacher et al. |
| 4,318,942 A | 3/1982 | Woerner et al. |
| 4,341,610 A | 7/1982 | Schumacher |
| 4,359,490 A | 11/1982 | Lehrer |
| 4,393,013 A | 7/1983 | McMenamin |
| 4,436,674 A | 3/1984 | McMenamin |

(Continued)

FOREIGN PATENT DOCUMENTS

| EP | 1023932 | 8/2000 |
| EP | 1437327 | 7/2004 |

(Continued)

OTHER PUBLICATIONS

Machine Translation for JP 08-259211 A. (Oct. 1996).*

(Continued)

Primary Examiner — Jennifer A Leung
(74) Attorney, Agent, or Firm — Greenberg Traurig, LLP

(57) ABSTRACT

In an embodiment, a reactor includes a section, wherein at least a portion of the section includes a base layer, wherein the base layer has a first composition that contains a silicide-forming metal element; and a silicide coating layer, wherein the silicide coating layer is formed by a process of exposing, at a first temperature above 600 degrees Celsius and a sufficient low pressure, the base layer having a sufficient amount of the silicide-forming metal element to a sufficient amount of a silicon source gas having a sufficient amount of silicon element, wherein the silicon source gas is capable of decomposing to produce the sufficient amount of silicon element at a second temperature below 1000 degrees Celsius; reacting the sufficient amount of the silicide-forming metal element with the sufficient amount of silicon element, and forming the silicide coating layer.

3 Claims, 16 Drawing Sheets

U.S. PATENT DOCUMENTS

| | | |
|---|---|---|
| 4,474,606 A | 10/1984 | McKaveney et al. |
| 4,608,271 A | 8/1986 | Hieber et al. |
| 4,714,632 A | 12/1987 | Cabrera et al. |
| 4,818,495 A | 4/1989 | Iya |
| 4,820,587 A | 4/1989 | Gautreaux et al. |
| 4,836,997 A | 6/1989 | Lepage et al. |
| 4,859,375 A | 8/1989 | Lipisko et al. |
| 4,883,687 A | 11/1989 | Gautreaux et al. |
| 4,891,201 A | 1/1990 | Schumacher |
| 4,900,411 A | 2/1990 | Poong et al. |
| 4,931,413 A | 6/1990 | Weir et al. |
| 4,956,169 A | 9/1990 | Ajioka et al. |
| 4,979,643 A | 12/1990 | Lipisko et al. |
| 5,026,533 A | 6/1991 | Matthes et al. |
| 5,077,028 A | 12/1991 | Age |
| 5,139,762 A | 8/1992 | Flagella |
| 5,165,908 A | 11/1992 | Van Slooten et al. |
| 5,242,671 A | 9/1993 | Allen et al. |
| 5,260,538 A | 11/1993 | Clary et al. |
| 5,284,676 A | 2/1994 | Accuntius et al. |
| 5,326,547 A | 7/1994 | Allen et al. |
| 5,374,413 A | 12/1994 | Kim et al. |
| 5,382,412 A | 1/1995 | Kim et al. |
| 5,405,658 A | 4/1995 | Ibrahim et al. |
| 5,445,742 A | 8/1995 | Almquist et al. |
| 5,516,345 A | 5/1996 | Brown |
| 5,776,416 A | 7/1998 | Oda |
| 5,795,659 A | 8/1998 | Meelu et al. |
| 5,798,137 A | 8/1998 | Lord et al. |
| 5,810,934 A | 9/1998 | Lord et al. |
| 5,910,290 A | 6/1999 | Hyppanen |
| 5,910,295 A | 6/1999 | DeLuca |
| 5,976,247 A | 11/1999 | Hansen et al. |
| 6,007,869 A | 12/1999 | Schreieder et al. |
| 6,060,021 A | 5/2000 | Oda |
| 6,368,568 B1 | 4/2002 | Lord |
| 6,451,277 B1 | 9/2002 | Lord |
| 6,465,674 B1 | 10/2002 | Kalchauer et al. |
| 6,541,377 B2 | 4/2003 | Kim et al. |
| 6,670,278 B2 | 12/2003 | Li et al. |
| 6,827,786 B2 | 12/2004 | Lord |
| 6,846,473 B2 | 1/2005 | Kirli et al. |
| 6,849,244 B2 | 2/2005 | Konig et al. |
| 6,852,301 B2 | 2/2005 | Block et al. |
| 6,887,448 B2 | 5/2005 | Block et al. |
| 6,932,954 B2 | 8/2005 | Wakamatsu et al. |
| 6,951,637 B2 | 10/2005 | Block et al. |
| 6,953,559 B2 | 10/2005 | Mleczko et al. |
| 7,001,579 B2 | 2/2006 | Metzger et al. |
| 7,029,632 B1 * | 4/2006 | Weidhaus et al. .............. 422/139 |
| 7,033,561 B2 | 4/2006 | Kendig et al. |
| 7,056,484 B2 | 6/2006 | Bulan et al. |
| 7,105,053 B2 | 9/2006 | Winterton et al. |
| 7,141,114 B2 | 11/2006 | Spangler et al. |
| 7,462,211 B2 | 12/2008 | Beech, Jr. et al. |
| 7,462,341 B2 | 12/2008 | Hoel et al. |
| 7,490,785 B2 | 2/2009 | Weidhaus |
| 7,553,466 B2 | 6/2009 | Herold |
| 7,708,828 B2 | 5/2010 | Weidhaus et al. |
| 7,790,129 B2 | 9/2010 | Lord |
| 2002/0081250 A1 | 6/2002 | Lord |
| 2002/0187096 A1 | 12/2002 | Kendig et al. |
| 2004/0028593 A1 | 2/2004 | Bulan et al. |
| 2004/0042950 A1 | 3/2004 | Mleczko et al. |
| 2004/0151652 A1 | 8/2004 | Herold et al. |
| 2005/0135986 A1 | 6/2005 | Weidhaus et al. |
| 2005/0161158 A1 | 7/2005 | Schumacher |
| 2006/0105105 A1 | 5/2006 | Ibrahim et al. |
| 2006/0183958 A1 | 8/2006 | Breneman |
| 2006/0249200 A1 | 11/2006 | Kato et al. |
| 2007/0098612 A1 | 5/2007 | Lord |
| 2007/0217988 A1 | 9/2007 | Amendola |
| 2007/0248521 A1 | 10/2007 | Kutsovsky et al. |
| 2007/0264173 A1 | 11/2007 | Sakida et al. |
| 2007/0292615 A1 | 12/2007 | Dordi et al. |
| 2008/0056979 A1 | 3/2008 | Arvidson et al. |
| 2008/0112875 A1 | 5/2008 | Garcia-Alonso et al. |
| 2008/0220166 A1 | 9/2008 | Ege et al. |
| 2008/0241046 A1 | 10/2008 | Hertlein et al. |
| 2008/0299291 A1 | 12/2008 | Weidhaus |
| 2010/0112744 A1 | 5/2010 | Molnar |
| 2010/0215562 A1 | 8/2010 | Sanchez et al. |
| 2010/0263734 A1 | 10/2010 | Froehlich et al. |
| 2010/0266762 A1 | 10/2010 | Fieselmann et al. |
| 2010/0273010 A1 | 10/2010 | Froehlich et al. |
| 2011/0027160 A1 | 2/2011 | Sanchez et al. |
| 2011/0117729 A1 | 5/2011 | Osborne et al. |

FOREIGN PATENT DOCUMENTS

| | | |
|---|---|---|
| JP | 08259211 A * | 10/1996 |
| KR | 10-2002-0059172 | 7/2002 |
| KR | 10-0416629 | 5/2004 |
| KR | 10-2007-0080306 | 8/2007 |
| WO | 2005/085133 | 9/2005 |
| WO | 2007/012027 | 1/2007 |
| WO | 2007/035108 | 3/2007 |

OTHER PUBLICATIONS

Haynes Interational. Corrosion-Resistant Alloys: Hastelloy(R) B-3(R) alloy. (1995).*

Definition of "layer". Retrieved from <http://dictionary.reference.com> on Jun. 6, 2012.*

International Search Report from PCT/US2010/031718 mailed Jun. 18, 2010.

International Search Report from PCT/US2010/027911 mailed May 11, 2010.

Gogotsi et al., "Nano Porous Carbide-Derived Carbon with Tunable Pore Size". Nature Materials, vol. 2, pp. 591-594, Sep. 2003.

Marra et al., "Reactions of Silicon-Based Ceramics in Mixed Oxidation Chlorination Environments". Journal of the American Ceramic Society, vol. 71 No. 12, pp. 1067-1073, Dec. 1988.

Ersoy et al., "Carbon coatings Produced by High Temperature Chlorination of Silicon Carbide Ceramics". Mat. Res. Innovat. 5: 55-62, 2001.

Landsberg et al., "The Chlorination Kinetics of Tungsten Molybdenum and their Alloys". J. Electrochem. Soc. Solid State Science, pp. 1331-1336, Aug. 1971.

Lin, "Mass Spectrometric Studies on High Temperature Reaction Between Hydrogen Chloride and Silica/Silicon". Mass Spectrometric Studies, vol. 123 No. 4, pp. 512-514, Apr. 1976.

"Oxygen, Carbon & Nitrogen in Silicon". Handbook of Semiconductor Silicon Technology, pp. 526-533. Dec. 1990.

"The Kinetics of Epitaxial Silicon Deposition by the Hydrogen Reduction of Chlorosilanes". B.E. Bradshaw—Int. J. Electronics, vol. 21, No. 3, pp. 205-227, 1966.

"A Through Thermodynamic Evaluation of the Silicon-Hydrogen-Chlorine System". L.P. Hunt, E. Sirtl—J. Electrochem. Soc., vol. 119, No. 12, pp. 1741-1745, Dec. 1972.

"High Temperature Reactions in the Silicon-Hydrogen-Chlorine System." E. Sirtl, L.P. Hunt, D.H Sawyer—J. Electrochem. Soc., vol. 121, No. 7, pp. 919-925, Jul. 1974.

LSA Silicon Material Task Closed—Cycle Process Development—Interim Summary Report August—JPL Contract No. 955006, Dec. 1978.

"Gas Phase Diffusion and Surface Reactions in the Chemical Vapour Deposition of Silicon". J. Bloem—Pure & Appl. Chem, vol. 50, pp. 435-447, 1978.

"Frictional Behavior of Carbide Derived Carbon Films Synthesized on Tungsten Carbide in Moderately Humid Air and Dry Nitrogen". Tlustochowicz, M., CLT Group Presentation, Jun. 22, 2001.

"Tribology of Carbide Derived Carbon Films Synthesized on Tungsten Carbide". Tlustochowicz, M., Energy Systems Division, Argonne National Laboratory, 2009.

"Processes & Process Developments in Japan". Toshio Noda, Osaka Titanium co. Ltd., p. 213-231, Feb. 1986.

"Silicon Production in a Fluidized Bed Reactor: Final Report". Rohatgi, N.K., Solar Array Project, Flat-Plate, Department of Energy, JPL Publication 86-17, Apr. 1986.

International Search Report and Written Opinion issued Jul. 15, 2011 by the Korean Intellectual Property Office for International Appln. No. PCT/US2010/057058.

Special Metals Incoloy® Alloy 825. Retrieved from http://www.matweb.com on Dec. 13, 2010.

Hastelloy® C2000® alloy. Haynes International, 2005.

International Search Report for International Appln. No. PCT/US2009/065345 dated Jul. 1, 2010.

* cited by examiner

Summary of Runs

| File | Sheet | Vapor | Temp C | Time h | Samples | Comments |
|---|---|---|---|---|---|---|
| Hotrun 1 | Sheet 2 | STC | 850 | 2.5 | C276, SS316, 625, G35 | oxygen present, not purged |
| Hotrun 1 | Sheet 3 | STC | 850 | 6.5 | C276, SS316, 625, G35 | purge with argon at 150 C no oxygen or water present less corrosion |
| Hotrun 1 | Sheet 4 | STC | 850 | 4.5 | SS316, 230, HR160, S, 75, 214 | try more alloys |
| Hotrun 1 | Sheet 5 | STC | 850 | | | combines 3 and 4 in table all show corrosion |
| Hotrun 1 | Sheet 6 | STC | 850 | 14.5 | 625, C276, 230, G35, 188, C22, X | longer run, show corrosion |
| Hotrun 1 | Sheet 7 | STC | 850 | 14.5 | C276, 230, 625, 188, C22 X | test STC at 650, no corrosion |
| Hotrun 1 | Sheet 8 | TCS/STC | 600 TCS | 421.5 | C276, 230, HR160, 188, C22, X | test STC at 850 |
| | | | 850 STC | | Restek, 316, Restek, C276 | test thin Si coat |
| Hotrun 1 | Sheet 10 | STC | 677 | 7.7 | SS316, 89, Hast 242, Nitronic | valve material test |
| Hotrun 1 | Sheet 11 | STC | 232 | 3 | o-rings, H900, Ruoraz ring | valve material test |
| Hotrun 1 | Sheet 12 | TCS | 600 | 4 | C276, SS316, 625, 230, 188, C22, HR180 | test coating with TCS |
| Hotrun 1 | Sheet 13 | TCS | 600 | 4 | bare 273, bare 625 | coat with TCS then expose to TCS+STC |
| Hotrun 1 | Sheet 14 | TCS+STC | 850 | 10 | C276, 625, X, 188, 556, HR160, 625 | TCS+STC |
| Hotrun 1 | Sheet 15 | TCS+STC | 850 | 12 | 230, 625, C22, 188, HR160, C276, 625 | test of TCS+STC 850C |
| Hotrun 1 | Sheet 15 | TCS | 427/371 | 6 | SS316 | test of stainless steel |
| Hotrun 1 | Sheet 16 | TCS+STC | 850 | 7 | 800H, HR120, 617, HR160, 230 | test new alloys and high temp alloys in TCS+TCS |

| 850 C | STC+TCS | 1562 | for 7.33 hr Final wt | | | | | | | | | | | |
|---|---|---|---|---|---|---|---|---|---|---|---|---|---|---|
| Alloy | Initial wt gm | wt after deposition gm | after wash gm | difference gm | % change | Surface | Density Met | Density Si | Length mm | width mm | run time hours | cc removed added | mm removed added | mil removed added |
| 800H | 7.87 | 7.726 | | -0.144 | -1.8297 | badly corroded | 7.95 | 2.33 | 27.01 | 12.07 | 7.3 | -0.0181 | -0.0278 | -1.084 |
| bare metal | | | | | | | | | | | | | | |
| HR 120 | 8.996 | 8.879 | | -0.117 | -1.3006 | badly corroded | 8.07 | 2.33 | 27.62 | 13.24 | 7.3 | -0.0145 | -0.0193 | -0.76 |
| bare metal | | | | | | | | | | | | | | |
| 617 | 14.923 | 14.877 | 14.678 | 0.154 | 1.06039 | covered with Si | 8.36 | 2.33 | 27.45 | 13.63 | 7.3 | 0.0661 | 0.0883 | 3.477 |
| bare metal | | | | | | | | | | | | | | |
| HR 160 | 9.956 | 10.111 | 10.112 | 0.155 | 1.55885 | covered with Si | 8.3 | 2.33 | 24.58 | 16.06 | 7.3 | 0.0585 | 0.0899 | 3.538 |
| bare metal | | | | | | | | | | | | | | |
| 230 | 10.592 | 10.773 | 10.772 | 0.181 | 1.70884 | covered with Si | 8.97 | 2.33 | 25.85 | 15.64 | 7.3 | 0.07777 | 0.0961 | 3.782 |
| bare metal | | | | | | | | | | | | | | |

Corrosion Studies

| Alloy | STC 850 C bare metal Oxygen and water | STC 650 C bare metal no oxygen and water | STC 850 C bare metal no oxygen and water | TCS 500C bare metal no oxygen and water | STC 850 over Si no oxygen and water |
|---|---|---|---|---|---|
| 316 SS | H | | | | |
| Hastalloy C276 | H | N | I | | N |
| Hastalloy C22 | | N | I | N | H no coating |
| Haynes 625 | H | S | H | H | |
| Haynes 185 | | N | H | N | N |
| Hastalloy X | | N | H | H | H no coating |
| Hastalloy G35 | H | | H | | |
| Haynes 230 | | N | H | H | H no coating |
| Haynes HR160 | | | H | N | N |
| Haynes 8 | | | H | | |
| Haynes 75 | | | H | | |
| Haynes 214 | | | H | | |
| | H - heavy corrosion | I - intermediate corrosion | S - slight corrosion | N - no corrosion | |

FIG. 9

| Samples to send out to SEM / EDS | | | |
|---|---|---|---|
| | Sample | Alloy | |
| First Batch of Coupons | | | |
| | 1 | C276 | bare metal |
| Run Second round #2 | 2 | C276 | only Si coating |
| | 3 | C276 | Si coating and 21 hrs of STC |
| | 4 | 188 | bare metal |
| Ran on round #1 | 5 | 188 | only Si coating - coats one flakes off |
| | 6 | 188 | Si coating and 21 hrs of STC |
| | 7 | HR160 | bare metal |
| Run First Round #2 | 8 | HR160 | only Si coating |
| Ran on round #1 | 9 | HR160 | Si coating and 21 hrs of STC |
| | 10 | 625 | bare metal |
| | 11 | 625 | only Si coating |
| | | | |
| Second Batch of Coupons | | | |
| Run third on round #2 | 12 | 617 | Run with TCS and STC |
| Run fourth on round #2 | 13 | 230 | Run with TCS and STC |
| Run fifth on round #2 | 14 | HR160 | Run with TCS and STC |

FIG. 13

REACTOR WITH SILICIDE-COATED METAL SURFACES

RELATED APPLICATIONS

This application claims the benefit of U.S. provisional application Ser. No. 61/170,962 filed Apr. 20, 2009, and entitled "FLUIDIZED BED REACTOR MADE OF SILICIDE-FORMING METAL ALLOY WITH OPTIONAL STEEL BOTTOM AND OPTIONAL INERT PACKAGING MATERIAL," which is hereby incorporated herein by reference in its entirety for all purposes.

BACKGROUND OF THE INVENTION

The present invention is directed to formation and use of certain surfaces that may form silicide protective coatings, allowing such coated surfaces to be used in applications in which surfaces without such protective coatings may be otherwise vulnerable to conditions, environments, and/or reactions associated with those applications.

For example, certain chemical reactions occur in environments that may have temperatures above 200 degrees Celsius, pressures significantly above the atmospheric pressure, and various corrosion agents. These environments may efficiently erode surfaces of containment structures in which the chemical reactions take place. For example, these environments may significantly reduce a life expectancy of such containment structures. Additionally, these environments may also negatively impact conditions and efficiencies of the chemical reactions themselves.

Further, the present invention relates to a multi-sectional reactor that has at least a portion of the reactor made from materials that may form the silicide coating. Further, the present invention relates to a multi-sectional reactor that has at least two portions of the reactor made from materials having different compositions. Further, the present invention relates to a multi-sectional reactor that includes internal inert fillers and/or structures.

BRIEF SUMMARY OF THE INVENTION

In one embodiment, a reactor, made in accordance with the instant invention, includes: a first section, wherein at least a portion of the first section includes i) at least one base layer, wherein the at least one base layer has a first composition that contains at least one silicide-forming metal element; and ii) at least one silicide coating layer, wherein the at least one silicide coating layer is formed by a process of 1) exposing, at a first temperature above 600 degrees Celsius and a sufficient low pressure, the at least one base layer having a sufficient amount of the at least one silicide-forming metal element to a sufficient amount of at least one silicon source gas having a sufficient amount of silicon element, wherein the at least one silicon source gas is capable of decomposing to produce the sufficient amount of silicon element at a second temperature below 1000 degrees Celsius; 2) reacting the sufficient amount of the at least one silicide-forming metal element with the sufficient amount of silicon element; and 3) forming the at least one silicide coating layer.

In one embodiment, the reactor further includes a second section, wherein the second section is constructed from a second composition; wherein the first and the second compositions are different; and an inert material, wherein the inert material occupies the second section of the reactor.

In one embodiment, the second section further includes i) a top portion having a first end and a second end, wherein the second end of the top portion has a first lip and wherein the first end is attached to the portion of the first section of the reactor; ii) a bottom portion having a first end and a second end, wherein the second end of the bottom portion forms the bottom of the reactor and wherein the first end of the second portion has a second lip; and wherein the first lip and the second lip are sufficiently designed to securely attach to each other.

In an embodiment, the reactor may further include a liner, wherein the liner extends from the inert material into the first section.

In an embodiment, there is a space between the inert material and the reactor to allow for an introduction of a gas. In an embodiment, there is a space between the liner and the reactor to allow for an introduction of a gas. In an embodiment, the gas is hydrogen.

In an embodiment, the inert material is selected from the group consisting of zirconium oxide, silicon nitrate, silicon carbide, silicon oxide, and aluminum oxide.

In an embodiment, at least one first part of the at least one base layer is sufficiently designed to form at least one first portion of the at least one silicide coating and at least one second part of the at least one base layer is sufficiently designed to form at least one second portion of the at least one silicide coating.

In an embodiment, the at least one silicide coating is sufficiently designed to withstand a substantial chemical corrosion at temperatures above 300 degrees Celsius.

In an embodiment, the at least one base layer comprises a ceramic material.

In an embodiment, the at least one base layer comprises a glass ceramic material.

In an embodiment, the at least one base layer comprises at least one metal selected from the group consisting of: aluminum (Al), carbon (C), calcium (Ca), cobalt (Co), chrome (Cr), copper (Cu), iron (Fe), molybdenum (Mo), silicon (Si), niobium (Nb), nickel (Ni), platinum (Pt), titanium (Ti), and tungsten (W).

In an embodiment, a composition of the at least one silicide coating depends on a temperature at which the at least one base layer is exposed to the at least one silicon source gas.

In an embodiment, the at least one silicon source gas includes at least one $H_xSi_yCl_z$, wherein x, y, and z is from 0 to 6.

In an embodiment, a reactor, made in accordance with the present invention, comprises a) a first section, wherein at least a portion of the first section comprises: i) at least one base layer, wherein the at least one base layer contains at least one silicide-forming metal element; ii) at least one silicide coating layer, wherein the at least one silicide coating layer is formed by a first process of 1) exposing, at a first temperature above 600 degrees Celsius and a sufficient low pressure, the at least one base layer having a sufficient amount of the at least one silicide-forming metal element to a sufficient amount of at least one silicon source gas having a sufficient amount of silicon element, wherein the at least one silicon source gas is capable of decomposing to produce the sufficient amount of silicon element at a second temperature below 1000 degrees Celsius; reacting the sufficient amount of the at least one silicide-forming metal element with the sufficient amount of silicon element, and forming the at least one silicide coating layer; and iii) at least one blocking layer.

In an embodiment, the at least one blocking layer is formed by a second process of: i) exposing the at least one silicide coating layer to a sufficient amount of at least one oxygen enriched gas, ii) reacting the sufficient amount of oxygen with a sufficient amount of at least one metal element in the silicide coating layer, and iii) forming the at least one blocking layer.

In an embodiment, the at least one blocking layer comprises a material selected from the group consisting of Al2O3, SiO2, Si3N4, and SiC.

BRIEF DESCRIPTION OF THE SEVERAL VIEWS OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention.

FIG. 7 depicts the results of an embodiment of corrosion resistance protocols run utilizing a variety of metal alloys, STC, and TCS gases (as silicon source gases).

FIG. 8 depicts the results of an embodiment of corrosion resistance protocols run utilizing a variety of metal alloys, STC, and TCS gases (as silicon source gases).

FIG. 9 depicts the results of an embodiment of corrosion resistance protocols run utilizing a variety of metal alloys, STC, and TCS gases (as silicon source gases), in the presence and/or absence of oxygen.

FIG. 7 depicts the physical appearance of alloys subsequent to exposure to TCS at a reactor temperature of 600 C, followed by exposure to STC at a reactor temperature of 850 C for 14.5 hours.

FIG. 13 is a summary of an embodiment of SEM analysis of various alloys subsequent to subjection of the alloys to the presence and absence of TCS and/or STC at varying temperatures within a reactor.

Figure 1:
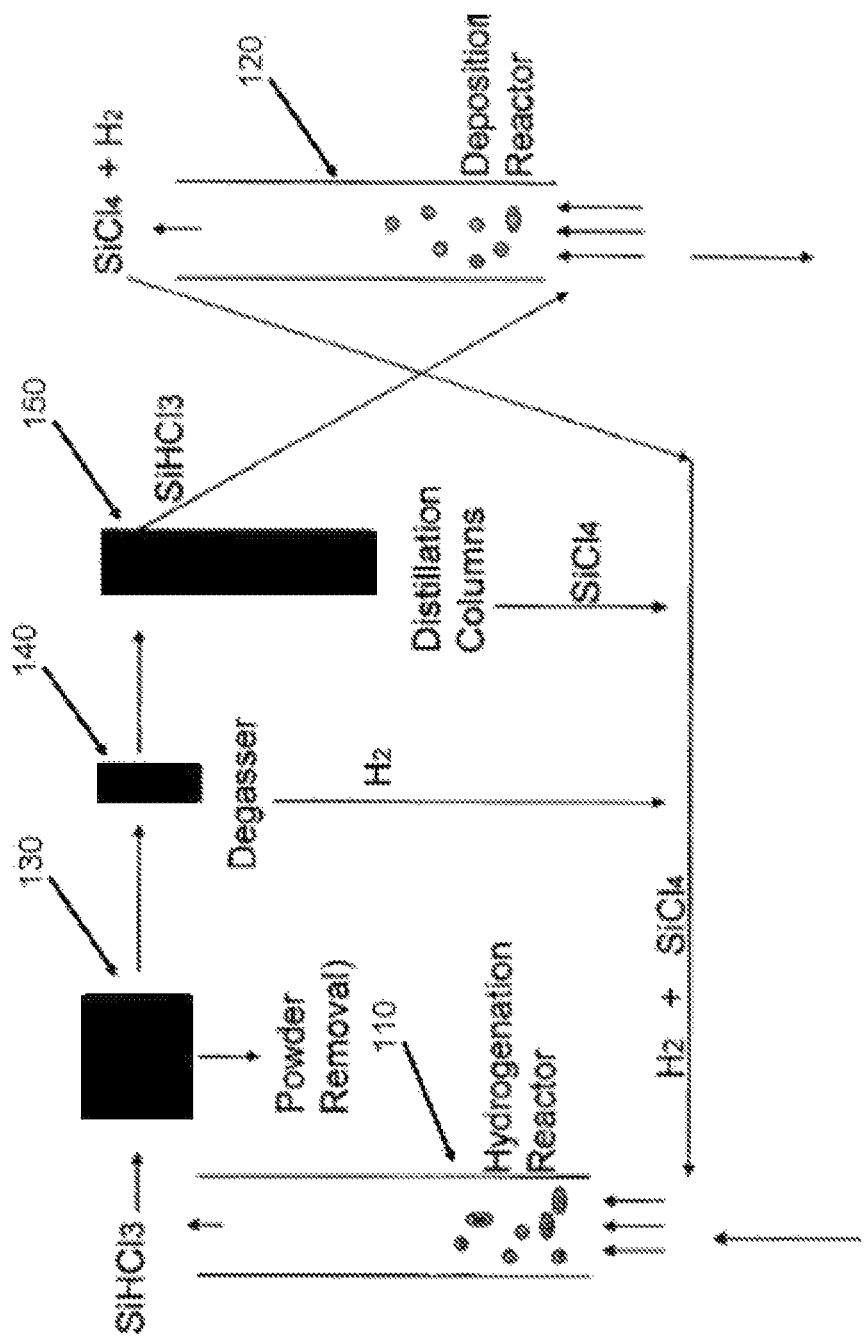
FIG. 1 depicts a schematic illustration of an example of a polysilicon plant such as used and described in the instant invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which falls within the scope and spirit of the principles of the presently disclosed invention.

DETAILED DESCRIPTION OF THE INVENTION

Examples of the application of the instant invention to processes for production of polysilicon, as further discussed herein, are provided simply for illustrative purposes, and therefore should not be deemed limiting with respect to another application, unrelated to the production of polysilicon, to which the instant invention can be readily applied based on the same or similar principles and/or conditions discussed herein.

Further, each of the examples given in connection with the various embodiments of the invention as applied to the silicon purification processes is intended to be illustrative as well, and not restrictive. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Highly pure polycrystalline silicon ("polysilicon") is a starting material for the fabrication of electronic components and solar cells. It is obtained by thermal decomposition of a silicon source gas or reduction, with hydrogen, of a silicon source gas.

For the purposes of describing examples of applications of the present invention in processes for production/enrichment/distillation of granular polysilicon, the following terms are defined:

"Silane" means: any gas with a silicon-hydrogen bond. Examples include, but are not limited to, $SiH_4$; $SiH_2Cl_2$; $SiHCl_3$.

"Silicide" means: a compound that has silicon in conjunction with more electropositive elements; in one example, a compound comprising at least a silicon atom and a metal atom; including, but not limited to, $Ni_2Si$; $NiSi$; $CrSi_2$; $FeSi_2$ "Silicon Source Gas" means: Any silicon-containing gas utilized in a process for production of polysilicon; in one embodiment, any silicon source gas capable of reacting with an electropositive material and/or a metal to form a silicide. In an embodiment, a suitable silicon source gas includes, but not limiting to, at least one $H_xSi_yCl_z$, wherein x, y, and z is from 0 to 6.

"STC" means silicon tetrachloride ($SiCl_4$).

"TCS" means trichlorosilane ($SiHCl_3$).

A chemical vapor deposition (CVD) is a chemical process that is used to produce high-purity solid materials. In a typical CVD process, a substrate is exposed to one or more volatile precursors, which react and/or decompose on the substrate surface to produce the desired deposit. Frequently, volatile by-products are also produced, which are removed by gas flow through the reaction chamber. A process of reducing with hydrogen of trichlorosilane ($SiHCl_3$) is a CVD process, known as the Siemens process. The chemical reaction of the Siemens process is as follows:

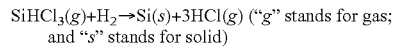
$SiHCl_3(g)+H_2 \rightarrow Si(s)+3HCl(g)$ ("g" stands for gas; and "s" stands for solid)

In the Siemens process, the chemical vapor deposition of elemental silicon takes place on silicon rods, so called thin rods. These rods are heated to more than 1000 C under a metal bell jar by means of electric current and are then exposed to a gas mixture consisting of hydrogen and a silicon source gas, for example trichlorosilane (TCS). As soon as the thin rods have grown to a certain diameter, the process has to be interrupted, i.e. only batch wise operation rather than continuous operation is possible.

Some embodiments of the present invention are utilized to obtain highly pure polycrystalline silicon as granules, hereinafter referred to as "silicon granules," in fluidized bed reactors in the course of a continuous CVD process of the thermal decomposition of a silicon source gas. The fluidized bed reactors are often utilized, where solid surfaces are to be exposed extensively to a gaseous or vaporous compound. The fluidized bed of granules exposes a much greater area of silicon surface to the reacting gases than it is possible with other methods of CVD process. A silicon source gas, such as $HSiCl_3$, or $SiCl_4$, is utilized to perfuse a fluidized bed comprising polysilicon particles. These particles as a result, grow in size to produce granular polysilicon.

Detailed embodiments of the present invention are disclosed herein; however, it is to be understood that the disclosed embodiments are merely illustrative of the invention that may be embodied in various forms. For instance, the disclosure of various embodiments of the present invention for application in processes of silicon deposition serves only as an illustration of the principals of the present invention and some specific applications, but the present invention may also be applied for other conditions (e.g. the Siemens process), environments, and/or reactions that may exhibit at least some of characteristics (e.g. thermal stability, reactive inertness, corrosion resistance, etc.) that are similar to at least one characteristic of the polysilicon process.

An embodiment of the thermal decomposition of a silicon source gas is shown in FIG. 1. In an embodiment, metallurgical grade silicon is fed into a hydrogenation reactor 110 with sufficient proportions of TCS, STC and $H_2$ to generate TCS. TCS is then purified in a powder removal step 130, degasser step 140, and distillation step 150. The purified TCS is fed into a decomposition reactor 120, where TCS decomposes to deposit silicon on beads (silicon granules) of the fluidized bed reactor. Produced STC and $H_2$ are recycled in to the hydrogenation reactor 110.

In one embodiment of the present invention, under certain specific conditions of operation, certain metal alloys (for example and without limitation, nickel-chrome-molybdenum alloys and nickel-chrome-cobalt alloys) tend to form a protective metal silicide coating in the presence of certain chlorosilane gases. In some embodiments, the metal silicide coating once formed will maintain its integrity during normal operation of a fluidized bed reactor.

Some embodiments of the present invention may provide benefits that may include an ability to operate, for example, silicon-producing reactions at relatively high temperatures to achieve effective reaction rates. Some other embodiments of the present invention may provide benefits that may include an ability to operate, for example, silicon deposition reactions not only at relatively high temperatures to achieve effective deposition rates but also to conduct reactions in highly corrosive conditions (e.g. in a presence of chlorine, a component of a silicon source gas).

Some embodiments of the present invention may allow to operate various chemical reactions at suitable temperatures above 200 degrees Celsius. Some embodiments of the present invention may allow to operate various chemical reactions at temperatures above 300 degrees Celsius. Some embodiments of the present invention may allow to operate various chemical reactions at temperatures above 400 degrees Celsius. Some embodiments of the present invention may allow to operate various chemical reactions at temperatures above 500 degrees Celsius. Some embodiments of the present invention may allow to operate various chemical reactions at temperatures above 600 degrees Celsius. Some embodiments of the present invention may allow to operate various chemical reactions at temperatures above 700 degrees Celsius. Some embodiments of the present invention may allow to operate various chemical reactions at temperatures above 800 degrees Celsius. Some embodiments of the present invention may allow to operate various chemical reactions at temperatures above 900 degrees Celsius. Some embodiments of the present invention may allow to operate various chemical reactions at temperatures above 1000 degrees Celsius. Some embodiments of the present invention may allow to operate various chemical reactions at temperatures above 1100 degrees Celsius. Some embodiments of the present invention may allow to operate various chemical reactions at temperatures above 1200 degrees Celsius. Some embodiments of the present invention may allow to operate various chemical reactions at temperatures between 200 degrees Celsius to 1200-2000 degrees Celsius.

Some embodiments of the present invention may use various types of materials in forming the inventive surfaces. For example, some embodiments may include solely metal-based materials. A metal is a chemical element identified as such in the Periodic Table of the Elements. Metals occupy the bulk of the periodic table, while non-metallic elements can only be found on the right-hand-side of the Periodic Table of the Elements. A diagonal line drawn from boron (B) to polonium (Po) separates the metals from the nonmetals. Most elements on this line are metalloids, sometimes called semiconductors. This is typically due to the fact that these elements exhibit electrical properties common to both conductors and insulators. Elements to the left of this division line are typically called metals, while elements to the right of the division line are called non-metals. The majority of metals have higher densities (the density of a material is defined as its mass per unit volume) than the majority of nonmetals. Metal-based materials include, but are not limited to, materials made of elements, compounds, and/or alloys. An alloy is a mixture of two or more elements in solid solution in which at least one major component is a metal.

For example, some embodiments may include ceramic or glass-ceramic materials, impregnated with metal-based materials, and/or a layered combination of ceramic or glass-ceramic materials with metal-based materials. Ceramics are typically composed of inorganic compounds, usually oxides of chemical elements. Ceramics may include non-oxide inorganic materials, such as nitrides, borides and carbides (e.g. silicon carbide and tungsten carbide). Ceramic materials are typically chemically inert, and often capable of withstanding chemical erosion that occurs in an acidic or caustic environment. Ceramics generally can withstand high temperatures ranging to at least 1600 degrees Celsius. Glass-ceramic materials typically share many properties with both non-crystalline glasses and ceramics. They are usually formed as a glass, and then partially crystallized by suitable heat treatment. For example, the microstructure of whiteware ceramics frequently contains both amorphous and crystalline phases so that crystalline grains are embedded within a non-crystalline intergranular phase of grain boundaries.

Such glass ceramics as whiteware have, for example, an extremely low permeability to liquids and are therefore used for reactors. In some embodiments, a mixture of lithium and aluminosilicates may yield an array of glass-ceramic materials with thermomechanical properties. Some embodiments made of glass-ceramics-based materials may exhibit characteristics of being impervious to thermal shock. In some embodiments incorporating glass-ceramic the negative thermal expansion coefficient (TEC) of the crystalline ceramic phase may be balanced with the positive TEC of the glassy phase (e.g. about 70% crystalline ceramic phase in some examples), such glass-ceramic materials, which may be used in some embodiments of the present invention, may exhibit improved mechanical properties and sustain repeated and quick temperature changes up to 800-1500° C.

Some embodiments of the present invention, the inventive surfaces may be formed in a sandwich from of at least two layers, which may be made from the same type of material or different. For example, in some embodiments, the inventive surfaces may be formed from layers of only metal materials; or a combination of ceramic/glass-ceramic materials and metal materials in any desirable sequence of layers that would still achieve the desirable properties of the final inventive surface; or a metal-impregnated ceramic material, or a combination of a metal-impregnated ceramic material and a metal-based material.

In one embodiment of the present invention, several nickel-chrome-cobalt alloys (e.g., alloy 617 and HR-160) are both pressure-reactor-code-allowable at the required design temperature and, if first properly pretreated to form a silicide coating, can in and of itself satisfy material-of-construction requirements so as to form a substantially corrosion-resistant reactor utilizable in the presence of halogen and/or halogen derivatives and other highly corrosive materials.

In one embodiment of the present invention, the use of such sufficiently inert coated metal alloys will allow for production of polysilicon from halogenated silicon source gases in a fluidized bed reactor that is constructed from a metal which meets ASME code requirements for pressure reactors. In addition, in one embodiment of the present invention, the use of the inert coating processes and materials of the instant invention will allow for manufacture of an inert coating utilizing a material other than non-chlorinated silane as a feedstock. In one embodiment of the present invention, as non-chlorinated silane is costly and hazardous to use (e.g. pyrophoric), use of the alloys and processes of the instant invention will result in an inertly-coated metal reactor that meets ASME ("The American Society of Mechanical Engineers") code requirements and is suitable for common chemical production methods, and that is manufactured using safer and more cost effective materials and methods.

In one embodiment, the present invention provides for protective (e.g. sufficiently inert) coating of a reactor wherein (1) a silicon source gas is introduced into the reactor having a base layer made from a metal alloy, (2) held at a suitable temperature, and (3) wherein the protective coating is deposited/formed on the exposed surface of the base layer of the metal alloy reactor due to decomposition of the silicon source gas. In one embodiment, when the silicon source gas is TCS, the decomposition that results in a formation of the protective silicide coating generally occurs in accordance with the following chemical formula (M stands for Poly-Si beads):

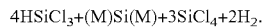
$4HSiCl_3+(M)Si(M)+3SiCl_4+2H_2$.

In one embodiment, the decomposing silicon source gas produces $SiCl_2$ intermediate.

In another embodiment, coating a base layer of a metal alloy reactor with a silicon so as to form a silicide coating on the surface of the metal alloy reactor results in a reactor substantially impervious to the formation of metal chlorides and associated corrosion when a corrosive and/or nucleophilic substance (for example, a halogen compound) is subsequently introduced into the reactor.

In one embodiment, the present invention provides for a formation of an in-situ protective (e.g. sufficiently inert) coating of the base layer of the reactor wherein an element that reacts with a silicon source gas sufficiently migrates from the base layer into the formed in-situ protective layer, reducing a thickness of the base layer.

In one embodiment, any alloy capable of forming a silicide is utilized. In another embodiment, an appropriate alloy may be utilized with or without cladding.

In another embodiment, the alloy is selected from the group consisting of calcium; chromium; cobalt; copper; iron; nickel; titanium; manganese; molybdenum; and/or platinum.

In one embodiment, the silicon source gas (such as TCS) is supplied at a sufficiently low pressure to the silicide-forming base layer. In one embodiment, the silicon source gas (such as TCS) is supplied at an atmospheric pressure to the silicide-forming base layer. In one embodiment, the silicon source gas (such as TCS) is supplied to the silicide-forming base layer at pressure, ranging 1-10 psia. In one embodiment, the silicon source gas (such as TCS) is supplied to the silicide-forming base layer at pressure, ranging 1-5 psia. In one embodiment, the silicon source gas (such as TCS) is supplied to the silicide-forming base layer at pressure, ranging 1-20 psia. In one embodiment, the silicon source gas (such as TCS) is supplied to the silicide-forming base layer at pressure, ranging 10-25 psia.

In another embodiment, the alloy utilized has any of the following compositions:

a) HAYNES HR-160 alloy is covered by ASME Reactor Code case No. 2162 for Section VIII Division 1 construction to 816 degrees Celsius and is composed of at least: Ni 37% (balance, depending of actual used formulation), Co 29%, Cr 28%, Mo 1% (maximum), W 1% (maximum), Fe 2% (maximum), Si 2.75%, and C 0.05%;

b) HAYNES 230 alloy is covered by ASME Reactor Code case No. 2063-2 for construction to 900 degrees Celsius and is composed of at least: Ni 57% (balance, depending of actual used formulation), Co 5% (maximum), Cr 22%, Mo 2%, W 14% (maximum), Fe 3% (maximum), Si 0.4%, Mn 0.5%, and C 0.1%;

c) HAYNES 617 alloy is composed of at least: Ni 54% (balance, depending of actual used formulation), Co 12.5% (maximum), Cr 22%, Mo 9%, Al 1.2%, Fe 1%, Ti 0.3%, and C 0.07%.

In another embodiment, the alloy is ASME approved for at least 800 degrees Celsius applications while maintaining sufficient strength.

In some embodiments, the present invention uses alloys that have about 3% or less of iron. In some embodiments, the present invention uses alloys that have about 2% or less of iron. In some embodiments, the present invention uses alloys that have about 1% or less of iron.

In another embodiment, a metal alloy utilized may act as a chlorosilane reaction catalyst.

In another embodiment, the chemical composition of the silicide produced by the reaction of an alloy and a silicon source gas may itself be temperature-dependent.

In another embodiment, the chemical composition of the silicide produced by the reaction of an alloy and a silicon source gas may itself be temperature-dependent as follows:

The formation of some embodiments of the inventive surfaces having protective coating that contains Nickel Silicide may be temperature depended as follows:

a) at about 250 degrees Celsius—no formation;
b) at about 350 degrees Celsius—$Ni_3Si$, and/or $Ni_5Si_2$;

c) at about 450-650 degrees Celsius—Ni$_2$Si (and other); and d) at about 900 degrees Celsius—NiSi.

In one embodiment, TCS is utilized, alone or in combination with STC.

In one embodiment, silicon TCS is utilized, alone or in combination with a silicon gas of the composition H$_2$SiCl$_2$ (dichlorosilane).

In another embodiment, TCS is utilized, alone or in combination with a silicon gas capable of forming a silicide layer when contacting the surface of a metal alloy.

In some embodiments, suitable temperatures, at which TCS is introduced into a reactor or the reactor is held at to form a protective silicide layer, include, but are not limited to, from about 600 degrees Celsius to about 1200 degrees Celsius.

In one embodiment, TCS is introduced to a reactor held at a temperature of about 700 degrees Celsius for a time sufficient to form a silicide coating on the reactor wall by reacting with a metal alloy comprising the reactor wall. In another embodiment, TCS is introduced to a reactor held at a temperature of about 850 degrees Celsius for a time sufficient to form a silicide coating on the reactor wall by reacting with a metal alloy comprising the reactor wall.

In another embodiment, introduction of silicon tetrachloride to a reactor held at a temperature of about 600 degrees Celsius will result in no alloy corrosion or silicon deposition effect.

In another embodiment, introduction of silicon tetrachloride to a reactor held at a temperature of about 850 degrees Celsius will result in substantial alloy corrosion and/or silicon deposition effect.

In another embodiment, introduction of TCS to a reactor will result in formation of a silicide layer on the reactor alloy wall; corrosion of the reactor alloy wall; deposition of a silicon layer on the reactor alloy and/or silicide layer; and/or have no effect, dependent on the temperature of the reactor.

In another embodiment, a gaseous mixture of TCS and STC will assume the physical and temperature-dependent properties of a TCS only composition.

In another embodiment, TCS or TCS and STC are introduced into a reactor held at a temperature of about 600-850 degrees Celsius.

In another embodiment, TCS or TCS and STC are introduced into a reactor held at a temperature of about 650-800 degrees Celsius.

In another embodiment, TCS or TCS and STC are introduced into a reactor held at a temperature of about 550-982 degrees Celsius.

In another embodiment, TCS or TCS and STC are introduced into a reactor held at a temperature of about 750-1000 degrees Celsius.

In accordance with some embodiments of the present invention, thickness and/or composition of the silicide-containing protective layer depends on a length of time that a reactor surface is exposed to silicon source gases.

In one embodiment, TCS is introduced to a reactor for a time sufficient to form a silicide coating on the reactor wall by reacting with a metal alloy comprising the reactor wall.

In another embodiment, TCS is introduced to a reactor for a time sufficient to form a silicide coating on the reactor wall by reacting with a metal alloy comprising the reactor wall prior to introduction of any silicon tetrachloride into the reactor.

In another embodiment, TCS is introduced to a reactor for a time sufficient to form a silicide coating on the reactor wall by reacting with a metal alloy comprising the reactor wall simultaneously with introduction of silicon tetrachloride into the reactor.

In another embodiment, TCS is introduced to a reactor for a time sufficient to form a silicide coating on the reactor wall by reacting with a metal alloy comprising the reactor wall. TCS and STC are then simultaneously introduced into the reactor.

In another embodiment, the silicon/silicide coating buildup on the alloy wall of the reactor may be controlled by surface attrition and/or by periodic thermal and/or chemical treatment.

In another embodiment, prior to an introduction of silicon source gases, a base layer of a wall of the reactor is exposed to an oxygen enriched gas (e.g. air) at a sufficient temperature and for a sufficient time to prepare a surface of the base layer to an exposure with a silicon source gas. In some embodiments, such oxygen priming of the base layer may result in an increased affinity of the formed protective silicide layer to the base layer during an operation of the reactor. In some embodiments, such oxygen priming is done at about 900 degrees Celsius for about 24 hours.

In one embodiment, a silicide layer is formed wherein the silicide layer substantially prevents corrosion of the underlying alloy and/or metal.

In another embodiment, a silicide layer is formed wherein the silicide layer substantially prevents leaching of contaminants from the underlying alloy and/or metal to the interior of the reactor.

Figure 2:
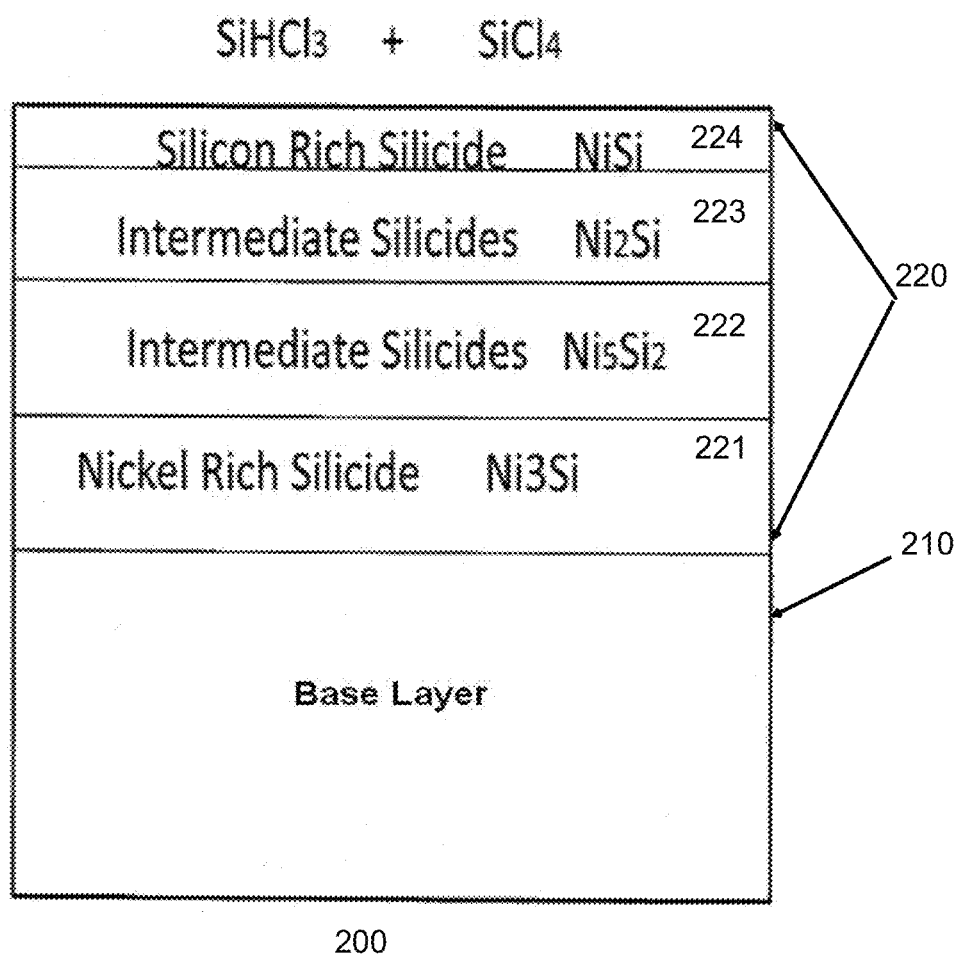
FIG. 2 depicts an embodiment of the present invention.

In another embodiment, FIG. 2 shows (without limitation) that the inventive surface 200 is formed in accordance with the invention when silicide-reactive element (e.g. Ni) contained within and/or on a surface of a base layer 210 reacts with silicon source gases to form a protective coating 220. FIG. 2 shows that in some embodiments, the protective coating 220 may be composed of more than a single silicide layer and each silicide layer (221-224). In some embodiments, each silicide layer (221-224) may be composed of several silicide compounds (of the same or different silicide-forming elements).

Moreover, in some embodiments, the base layer 210 may be comprised of a single layer of metal-based material or ceramic/glass-ceramic-based material that has at least a portion of the base layer 210 that contains at least one element that would react with silicon source gases to produce the protective coating 220.

Further, in some embodiments, the base layer 210 may be a sandwich of layers of different types materials but having at least a portion of at least one of the layers, which would be exposed to silicon source gases, to contain at least one element that would react with silicon source gases to produce the protective coating 220.

In some embodiments, amount and disposition of Ni (i.e. a silicide-forming element) in the base layer define characteristics of the silicide layer(s) within the protective coating 220.

In some embodiments, as the protective coating 220 is being formed (in-situ), a thickness of the base layer 210 is reduced due to migration of the silicide-forming element(s) from the base layer into the protective coating 220. In one example, the base layer 210 having original thickness of about a half inch and containing a silicide-forming element in a suitable concentration, upon being exposed to silicon source gas, forms the protective layer of about 200-400 nm after the base layer 210 is being exposed for 24 to 48 hours to silicon source gas.

In some other embodiments, the protective coating 220 has a thickness that varies from about 50 micron to at least 400 micron ($10^{-6}$ m). In another embodiment, as an overall thickness of the inventive surface increases, the original thickness of the base layer 210 is reduced in the inventive process.

In some embodiments, a thickness of the protective coating 220 depends on a suitable concentration of the silicide-forming element(s) and a suitable time that the base layer 210 is exposed to silicon source gas.

In some embodiments, after an original thickness of the base layer 210 is reduced due to a formation of silicide to a thickness at which it is deemed the reactor is no longer suitable for its intended purpose, the reactor is de-commissioned. In an embodiment, a reactor is decommissioned when a half inch base layer is reduced by more than about a sixteenth of an inch.

In another embodiment, the relative thickness, stability, and/or atomic composition of the silicide layer is assessable utilizing scanning electron microscopy (SEM) and/or other relevant analysis methods, such as EDAX (Energy Dispersive X-Ray Analysis).

Figure 3:
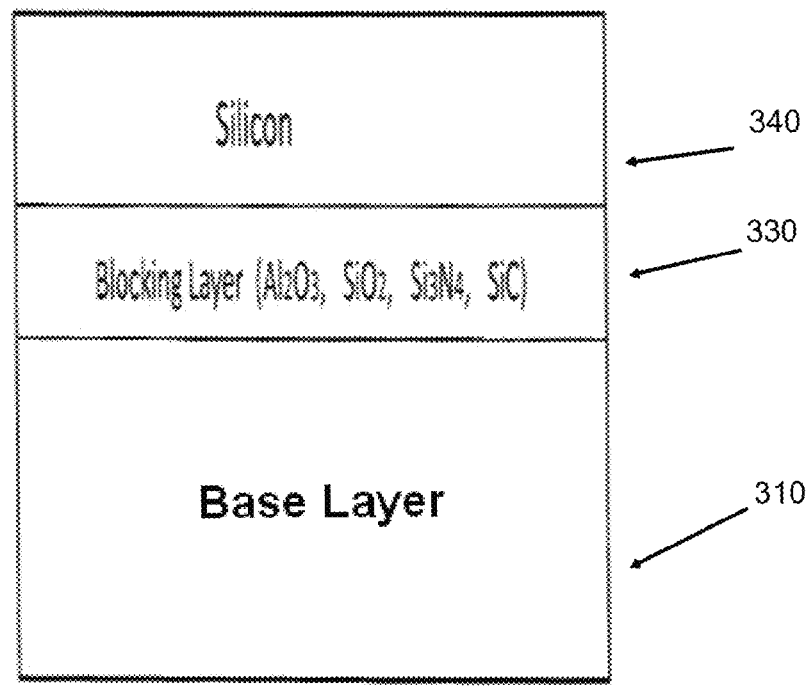
FIG. 3 depicts a schema to be utilized to form an embodiment of the present invention.
Figure 4:
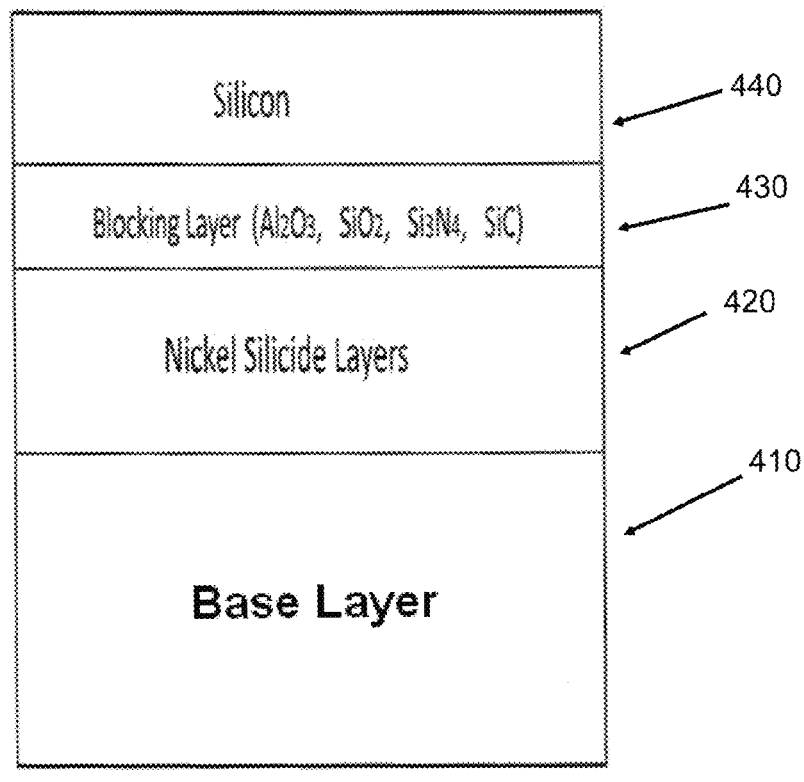
FIG. 4 depicts an embodiment of the present invention.

In another embodiments, as shown in FIGS. 3 and 4, the protective coating(s) of surfaces of the present invention may also include at least one blocking layer 330,430 (including, but not limited to, $Al_2O_3$; $SiO_2$; $SiN_3$; and/or SiC). In some other embodiments, the protective coating(s) of surfaces of the present invention may also include at least one blocking layer 330, 430 and a silicon layer 340, 440. The at least one blocking layer 330, 430 is formed when the silicide layer 420 and/or a base layer 310, 410 is exposed to an oxygen enriched gas (e.g. air) at a sufficient temperature and for a sufficient time.

In some embodiments, blocking layer(s) is (are) deposited or coated over silicide layer(s) by any suitable mechanical, chemical, or electrical means (e.g. CVD (e.g. aluminizing), plating, etc).

In some embodiments, the inventive surfaces of the present invention include alternate blocking layers of different compositions and/or chemical/mechanical characteristic(s) to be positioned between the silicide layer 420 and the silicon layer 440.

In some embodiments, the formed blocking layer(s) 430 cure(s)/seal(s) silicide layer(s) 420 so that an overall affinity of a protective coating to the base layer 410 is improved. In some embodiments, the presence of the blocking layer 430 may prevent flaking of the protective coating and contaminating with flakes a chemical reaction occurring in a reactor. In some embodiments, the blocking layer(s) 430 prevents flaking off of the protective coating (flakes) during a cooling period of a reactor. In some embodiments, a silicide layer 320 is only exposed to an oxygen enriched gas (e.g. air) before a reactor is cooled after main reaction(s) for which the reactor is designed has(ve) been completed.

In some embodiments, when a reactor made in accordance with the present invention is cooled for maintenance or other purpose, prior to being again commissioned, the internal surfaces of the reactor having protective silicide coating are exposed to an oxygen enriched gas (e.g. air) at a suitable temperature for a sufficient time to create the blocking layer. In some embodiments, having the blocking layer allows the reactor to function at higher temperatures without having the "flaking off" effect for silicide coating and thus preserving the anti-corrosion qualities of the protective coating. In some embodiments, surfaces of the present invention are designed to withstand continuous substantial fluctuations in temperatures to which they are exposed to (e.g. from room temperature to about 1200 degrees Celsius, from 100 degrees Celsius to about 900 degrees Celsius, etc.) without significant loss of their desirable anti-corrosion and other properties.

In some embodiments, as shown in FIGS. 3 and 4, the silicon layer 340, 430 is formed/deposited when silicon is generated by the silicon producing reactions (e.g. reduction or thermal decomposition reactions) during actual operation of a reactor (see FIG. 1), is produced as a by-product during a formation of the protective silicide layer, and/or generated in/delivered into the reactor by some other suitable means. In some embodiments, the silicon layer 340, 440 is formed from a silicon that generates during the decomposition reaction such as the one, for example, shown in FIG. 1.

Figure 5:
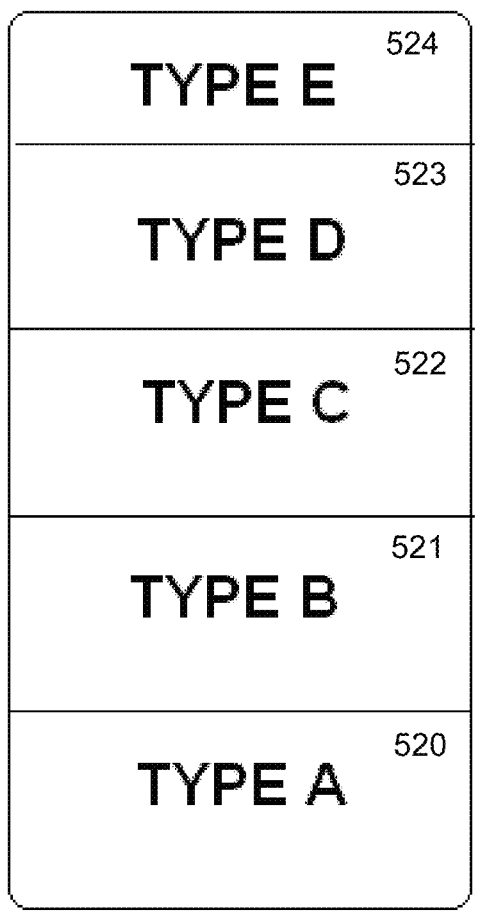
FIG. 5 depicts an embodiment of the present invention.

Referring to FIG. 4, showing a portion 550 of an internal surface of a reactor. In some embodiments of the present invention, as shown by FIG. 5, manipulating at least one of the following conditions may produce the inventive surface 550 that would have areas (520-524) of the protective coating having the same and/or different characteristics (Types A-E):

1) a composition and disposition of silicide-forming element(s) in a base layer;
2) temperature at which the base layer is exposed to silicon source gases;
3) a length of the exposure;
4) a rate of supplied silicon source gas, and
5) a presence of a blocking layer.

For example, in some embodiments, manipulating at least one of the above referenced conditions may result in having more protective coating in a reaction area of a reactor and having less protective coating in other area which are subject to less harsher environment (e.g. lower temperature, lesser corrosion reagents, etc.)

In some embodiments, a silicon source gas, such as TCS, is supplied at a sufficient rate to allow an effective deposition of Si to form the protective layer. In some embodiments, a silicon source gas is supplied at a rate of 0.1-150 lb/hr. In some embodiments, a silicon source gas is supplied at a rate of 10-100 lb/hr. In some embodiments, a silicon source gas is supplied at a rate of 0.1-20 lb/hr. In some embodiments, a silicon source gas is supplied at a rate of 1-50 lb/hr. In some embodiments, a silicon source gas is supplied at a rate of 5-75 lb/hr.

The following discussion relates to some exemplary embodiments of the present invention.

Experiment 1

Protocol for Assessing Relative Corrosion of an Alloy Exposed to Halogenated Silicone Source Gases One example of a corrosion test utilized to determine the relative effectiveness of the alloy/inert layer combination in resisting corrosion is set forth below.

Figure 6:
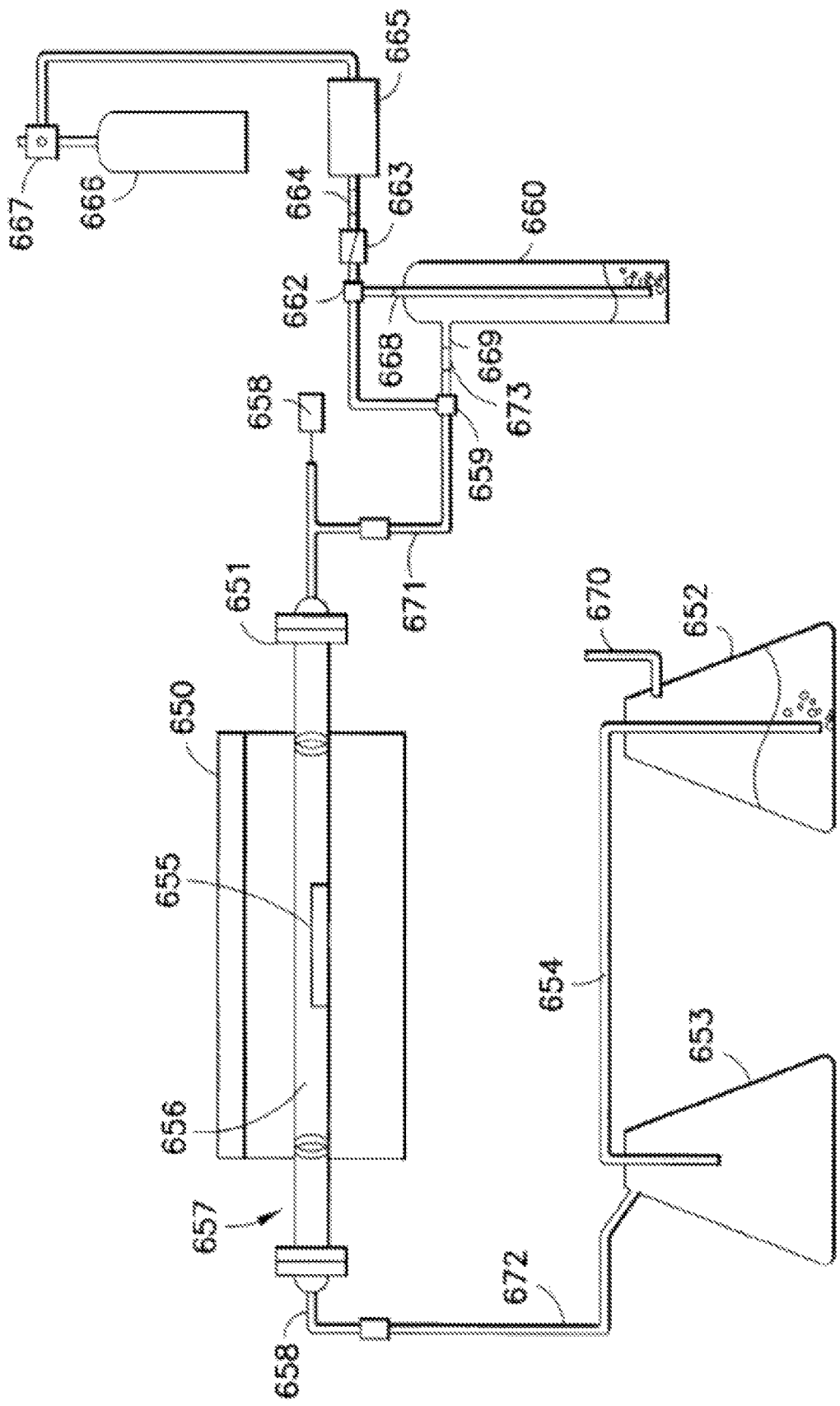
FIG. 6 depicts an embodiment of a testing apparatus as described in Example 1 for assessing relative corrosion of alloy samples tested under a variety of experimental conditions.

An apparatus such as that depicted in FIG. 6 is utilized. In one embodiment, the furnace 650 is a Thermcraft single zone model XST-3-0-36-1C with a 3 inch ID (230 volts 6780 watts). The tube 656 is 36 inches×3 inches with a volume of about 5 L with the end caps 651, 657. The samples sit in a quartz boat 655. Get a tare weight for the empty bubbler 660 or note the tare weight written on the tag on the bubbler 660. Fill the bubbler 660 with 150-200 ml of silicon tetrachloride. The bubbler 660 is filled by adding 60 ml of chlorosilane using a 60 ml syringe and ⅛ inch Teflon tubing several times.

If the bubbler 660 is filled, check the weight of chlorosilane. There should be at least 50 grams of chlorosilane (TCS or STC).

Weigh the bubbler 660 to determine the amount of silicon tetrachloride that was added or was in the bubbler at the start time of the run. Connect the bubbler 660 back so the top end 668 goes to the argon cylinder 666 and the exit end 669 goes to the tube through a 3-way valve 659.

Fill the trap 652, 653 with 900 ml of 25% sodium hydroxide (450 gm of 50% NaOH mixed with 450 gm of water). Put the outlet of the tube 654 below the liquid level in the scrubber 652, 653. Make sure the exhaust 670 from the scrubber 652 goes out to the hood exhaust.

Record the initial mass of 3-5 metal coupons and their identity. Place them in a boat 655 at the center of the tube furnace 650. Seal both ends 651, 657 of the tube 656 with the viton O-ring and the clamp.

Start the flow of Argon at 200 ml/minute and heat the furnace 650 to 150 degrees Celsius. Run under these conditions for 1 hour to remove the oxygen and water from the tube.

Check to make sure that the system is sealed and that there are bubbles coming out of the scrubber 652, 653. Periodically check that the exit line 672 to the scrubber 653, 652 is not plugged. If it is plugged, cut off the plug and make sure the scrubber 652, 653 is working.

Reduce the flow of argon to 8 ml/minute and heat the oven 650 gradually to 850 degrees Celsius over an hour. Make sure that the pressure on the outlet of the gas regulator 663 does not go over 8 psig. If the outlet to the tube plugs, this is the pressure (8 psig) to which the tube will rise.

Turn on the bubbler 560 to deliver chlorosilane using the three way valve 659. Turn on the exit valve first and then the entrance valve. Confirm that there is flow coming out of the scrubber 652, 653 as indicated by bubbles. Note the time that the chlorosilane started to flow.

Periodically during the run check that the outlet line to the scrubber 652, 653 is not plugged and the proper flow of 8 ml per minute is going through the scrubber 652, 653 to the exhaust.

When the run is over, turn off the furnace 550. Also, turn the three way valves 662 on the bubbler 660 so that they deliver argon. Turn the inlet side first and then the outlet end. Raise the argon flow to 200 ml per minute for 30 minutes to purge out the tube 556 to remove the chlorosilane. Make sure the scrubber 652, 653 does not plug.

Reduce the flow of gas to 8 ml per minute and let the furnace 650 cool overnight The next morning when the furnace has cooled, make sure the scrubber 652, 653 is not plugged. Cut out the plug if necessary. Turn off the argon flow.

Open the exit end of the tube 656 and draw out the boat 655 with the samples.

Place the samples in a cup of water and stir to remove insoluble material (iron chloride or nickel chloride). Stir for five minutes. Then, move to another cup until there is no more color or material coming off of the samples. (Green is the color of nickel chloride and blue is the color of cobalt (II) chloride).

Dry the samples and weigh them to the nearest milligram. Determine the weight change and the percent weight change.

Clean out any residue in the ends of the tubes. The red or yellow material that collects on the end of the tube is silicon (II) oxide that quickly oxidizes to silicon (IV) dioxide on exposure to air. If the tube 656 has been properly purged free of oxygen before the runs start, there should be very little silicon oxide residue.

The system is now ready to start another run by going to Step 1 above.

In another embodiment, a vapor pressure of STC in the bubbler 660 is 0.27 atmosphere (atm). In another embodiment, a vapor pressure of TCS in the bubbler 660 is 0.66 atmosphere (atm). In another embodiment, the test apparatus may further consist of shut off valves 664, 673, and mass flow controller 665. In another embodiment, certain components of the test apparatus are connected by Teflon tubing 654, 671, and 672.

Example 2

Utilization of Certain Alloy and Halogenated Silicon Source Gases in an Assessment Of Relative Corrosion FIGS. 7 and 8 demonstrate corrosion resistance data wherein several alloys were exposed to chlorosilanes at 850 degrees Celsius.

From several corrosion test runs depicted in FIGS. 7 and 8, it is clear that using certain alloys in conjunction with treatment with certain silicon source gases capable of reacting with said alloys to form silicide coatings facilitates manufacture of a reactor that could withstand the conditions that one would encounter in a TCS/polysilicon deposition reactor (temperatures at 850 degrees Celsius and presence of chlorosilanes).

Example 3

Utilization of Certain Alloy and Halogenated Silicon Source Gases in an Assessment of Relative Corrosion, in Experimental Conditions with the Presence/Absence of Oxygen FIGS. 9 and 10 demonstrate the use of various alloys in a corrosion resistance protocol such as that illustrated in Example 1, utilizing various permutations of alloy materials; silicone source gases capable of forming silicides with said alloys; and interior reactor conditions with and without the presence of oxygen. As demonstrated in FIG. 9, alloys in an oxygenated environment without silicide formation exposed to silicon tetrachloride demonstrated corrosion. Alloys in an oxygen-free environment exposed to silicon tetrachloride demonstrated corrosion, albeit to a lesser degree. Alloys reacting with a TCS silicone source gas so as to form a silicide on the surface of the alloy prior to introduction of a silicon tetrachloride demonstrated reduced corrosion an deposition of silicon on the silicide layer.

Figure 10A:
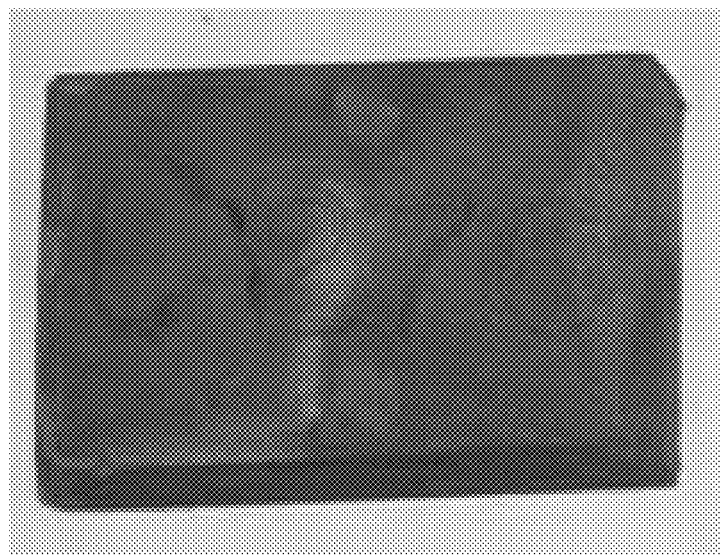
FIGS. 10A and 10B depict the results of an embodiment of corrosion resistance protocols run utilizing a variety of metal alloys, STC, and TCS gases (as silicon source gases), in the presence and/or absence of oxygen.
Figure 10B:
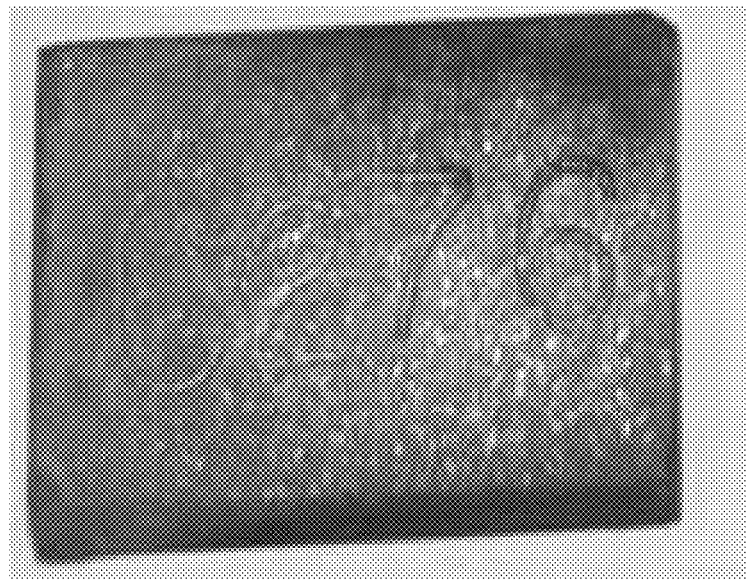

Referring to FIGS. 10A and 10B, FIG. 10A shows a corrosion of a plate made from C276 alloy after the plate was exposed for 14 hours to STC at 850 degrees Celsius, which was not pre-treated with TCS to form a protective silicide coating. In contrast, FIG. 10B shows absence (or a significant lesser degree) of a corrosion of a plate made from C276 alloy after the plate was exposed for 14 hours to STC at 850 degrees Celsius because the plate was pre-treated with TCS to form a protective silicide coating.

Example 4

Utilization of Certain Alloy and Halogenated Silicon Source Gases in an Assessment of Relative Corrosion, in Experimental Conditions with the Presence/Absence of Oxygen FIGS. 11A-11F (pre-wash) and 12A-12F (post-wash) demonstrate the use of various alloys in a corrosion resistance protocol such as that illustrated in Example 1, utilizing various permutations of alloy materials; silicone source gases capable of forming silicides with said alloys; and interior reactor conditions with and without the presence of oxygen.

Figure 11C:
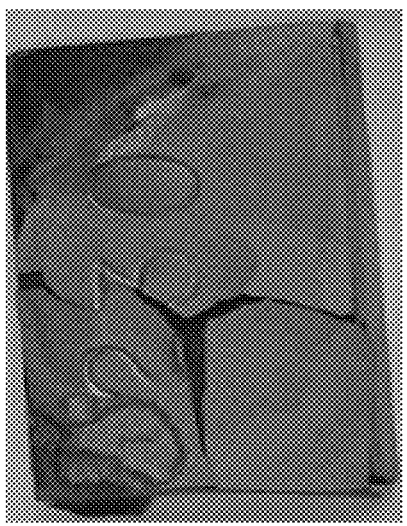
FIGS. 11A-11F (before wash) and 12A-12F (after wash) depict the results of an embodiment of corrosion resistance protocols run utilizing a variety of metal alloys, STC, and TCS gases (as silicon source gases), in the presence and/or absence of oxygen. In particular.
Figure 11F:
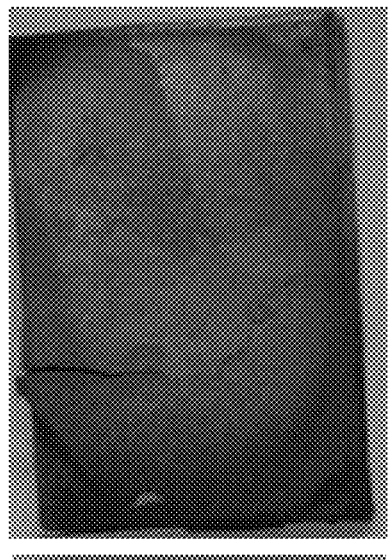
Figure 11B:
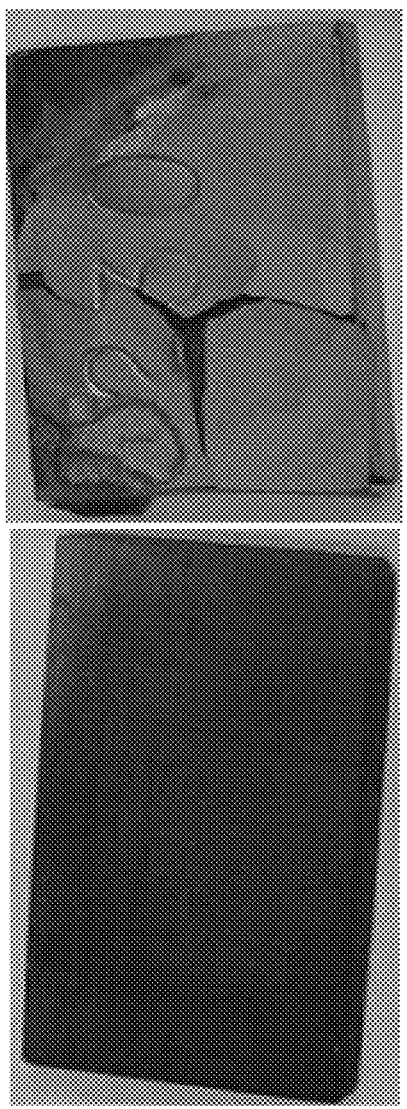
Figure 11E:
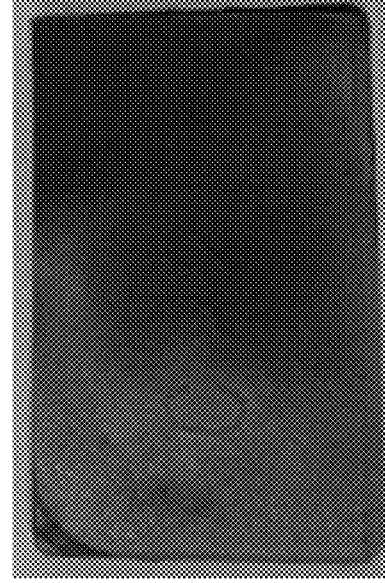
Figure 11A:
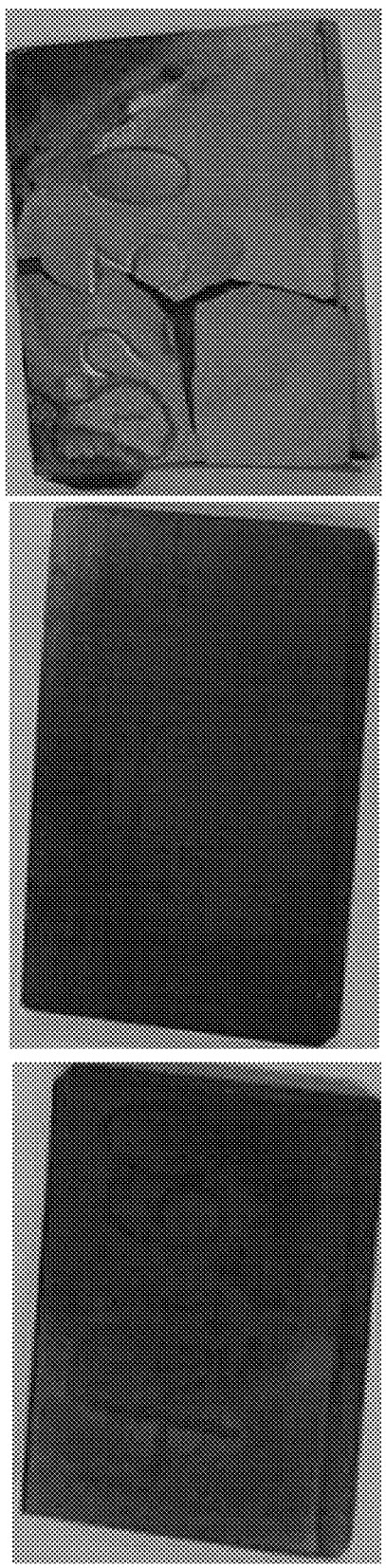
Figure 12A:
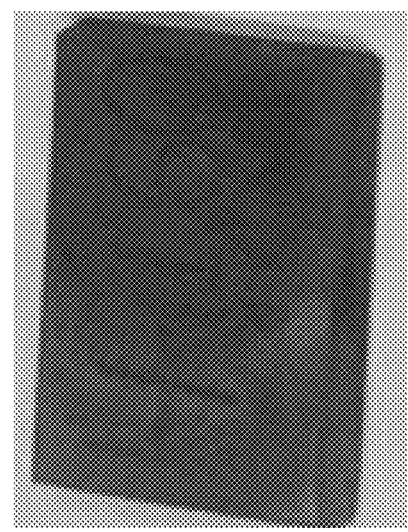

FIGS. 11A and 12A corresponds embodiments with a base layer made from alloy H160.

Figure 12B:
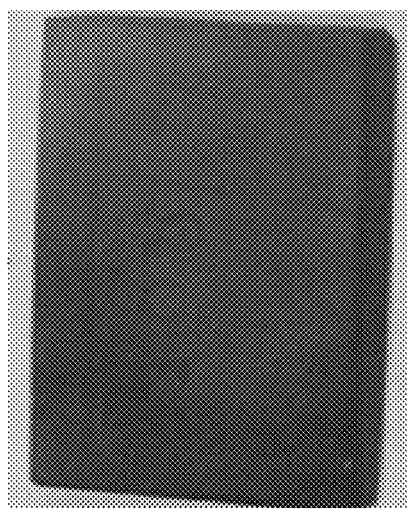

FIGS. 11B and 12B corresponds embodiments with a base layer made from alloy 188.

Figure 12C:

FIGS. 11C and 12C corresponds embodiments with a base layer made from alloy 230.

Figure 11D:
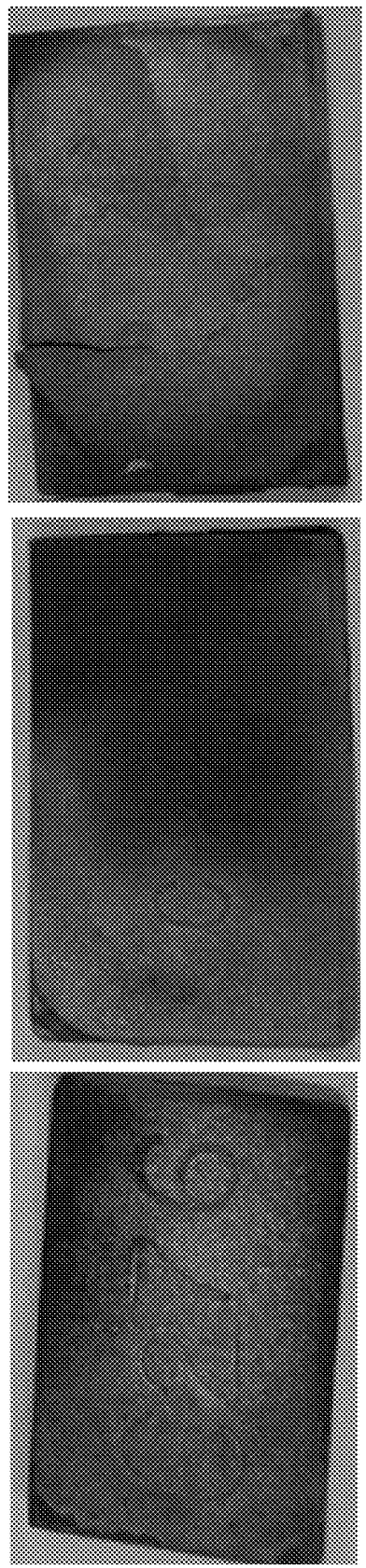
Figure 12D:

FIGS. 11D and 12D corresponds embodiments with a base layer made from alloy C276.

Figure 12E:

FIGS. 11E and 12E corresponds embodiments with a base layer made from alloy C22.

Figure 12F:

FIGS. 11F and 12F corresponds embodiments with a base layer made from alloy X.

As demonstrated in FIGS. 11A-11F and 12A-12F, certain alloys exposed to silicon tetrachloride demonstrated corrosion. Alloys reacting with a TCS silicone source gas so as to form a silicide on the surface of the alloy prior to introduction of a silicon tetrachloride for 14 hours at 850 degrees Celsius demonstrated deposition of silicon on the silicide layer and reduced corrosion.

FIG. 13 depicts the results of corrosion resistance protocols run for embodiments utilizing a variety of metal alloys, STC, and TCS gases (as silicon source gases).

Below is a summary of the behavior of certain alloys used as a base layer in some embodiments of the present invention, in the presence and absence of TCS and/or STC at varying temperatures within a reactor.

a) alloys C276, 625, 188, and HR 160 were able to form silicide-coating (textured coating) in presence of silicon tetrachloride and thus would prevent corrosion of an embodiment at 600 degrees Celsius ("M" stands for metal of the base layer):

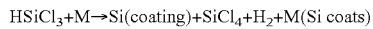

$HSiCl_3 + M \rightarrow Si(coating) + SiCl_4 + H_2 + M(Si\ coats)$ b) alloys 230, C22, X, and 556 were unable to form silicide-coating in presence of silicon tetrachloride and would not prevent corrosion of an embodiment at 600 degrees Celsius:

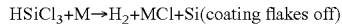

$HSiCl_3 + M \rightarrow H_2 + MCl + Si(coating\ flakes\ off)$ c) alloys C276, 230, 617, 625, and HR 160 were able to form at least some silicide-coating (uneven specular coating) in presence of silicon tetrachloride and thus would prevent corrosion of an embodiment at 850 degrees Celsius:

$HSiCl_3 + SiCl_4 + M \rightarrow Si + SiCl_4 + H_2 + M(Si\ coats)$ d) alloys 800H, C22, 188, and HR120 were unable able to form silicide-coating in presence of silicon tetrachloride and would not prevent corrosion of an embodiment at 850 degrees Celsius:

Example 5

Corrosion Versus Coating Dependent on Mixture of STC, TCS and Temperature of Reactor FIG. 13 is one embodiment of the present invention, depicting the behavior of certain alloys in the presence and absence of TCS and/or STC at varying temperatures within a reactor. As demonstrated in FIG. 13, (a) use of TCS in a reactor at 600 degrees Celsius wherein the alloy used for the reactor wall is of a particular composition may result in a silicide coating of the alloy reactor walls that substantially prevents corrosion. (b) Use of TCS in a reactor at 600 degrees Celsius wherein the alloy used for the reactor wall is of a different composition may result in a silicide coating of the alloy reactor walls that prevents corrosion/creates a durable silicide inert layer to a lesser degree. (c) Use of TCS in a reactor at 850 degrees Celsius wherein the alloy used for the reactor wall is of the same composition as (a) above may result in a silicide coating of the alloy reactor walls that prevents corrosion/creates a durable silicide inert layer to a lesser degree. (d) Use of TCS in a reactor at 850 degrees Celsius wherein the alloy used for the reactor wall is of a different composition than that of (a) and (c) above may result in a silicide coating of the alloy reactor walls that prevents corrosion/creates a durable silicide inert layer to a lesser degree.

Figure 14:
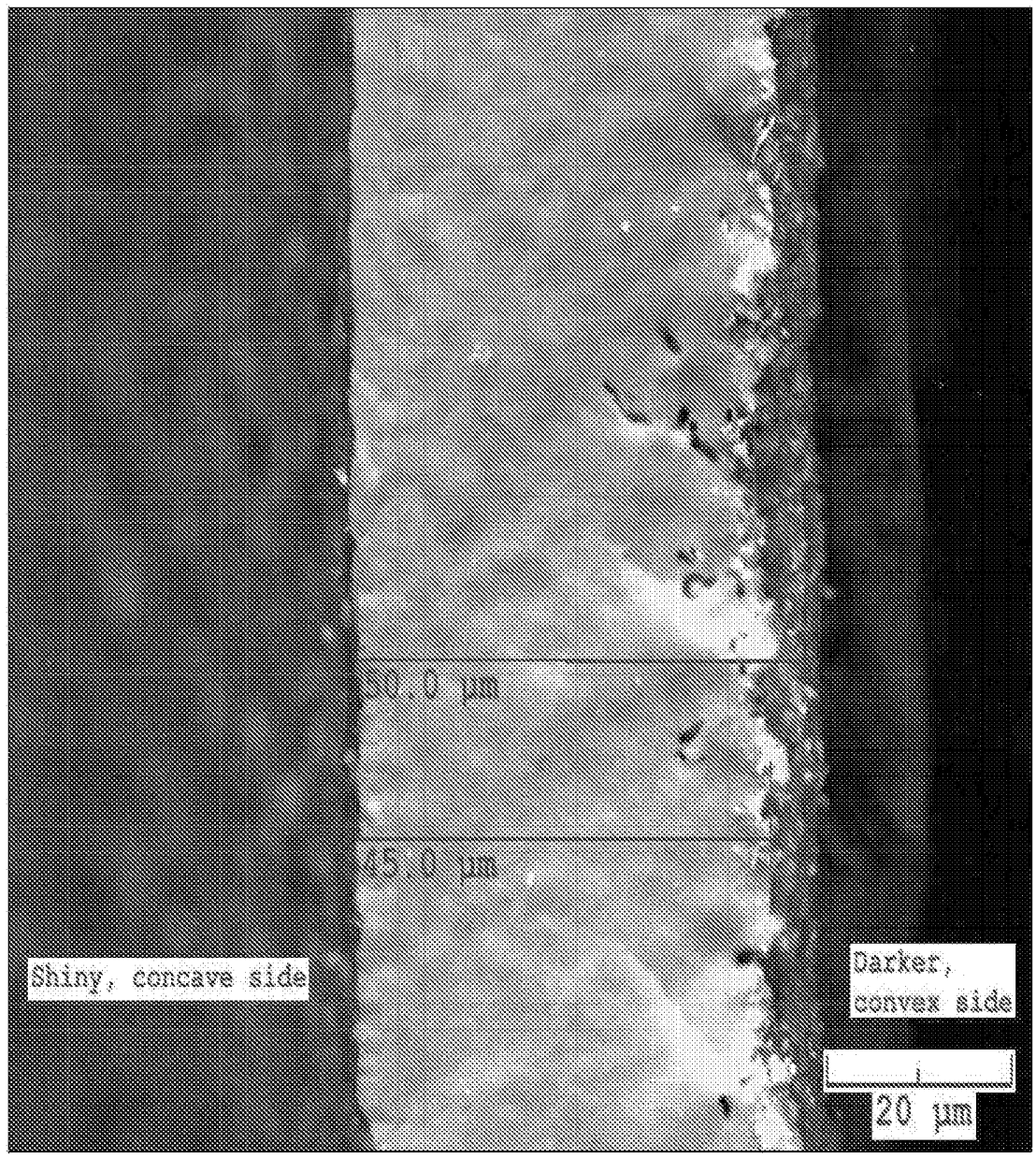
FIG. 14 shows a piece of a surface in accordance with an embodiment of the present invention.

Referring to FIG. 14, representing data regarding some embodiments of the present invention. FIG. 14 shows a piece of material that came off of a reactor during its operation and/or after the reactor is being cooled. Edax result of a study of a composition of a concave side (inner side, which is away (opposite) from the base layer—i.e. directly exposed to reaction environment) of the piece of "flaked off" material in FIG. 14 showed the presence of only Si (100 wt. %).

In contrast, Edax result of a study of a composition of a convex side (outer side, which is attached to the silicide layer of the reactor) of the piece of "flaked off" material in FIG. 14, showed the following composition: Si (86.6 wt. %), Cr (0.9 wt. %), Mn (0.5 wt. %), and Ni (12.0 wt. %). Consequently, the material of FIG. 14 demonstrated that a silicon inner layer was produced and it grew from the silicide layer that coated the base metal. In some embodiments, the oxide treatment and a blocking layer improved the sufficient affinity of such material in FIG. 14 to a reactor.

In one embodiment, a reactor, made in accordance with the instant invention, includes: a first section, wherein at least a portion of the first section includes i) at least one base layer, wherein the at least one base layer has a first composition that contains at least one silicide-forming metal element; and ii) at least one silicide coating layer, wherein the at least one silicide coating layer is formed by a process of 1) exposing, at a first temperature above 600 degrees Celsius and a sufficient low pressure, the at least one base layer having a sufficient amount of the at least one silicide-forming metal element to a sufficient amount of at least one silicon source gas having a sufficient amount of silicon element, wherein the at least one silicon source gas is capable of decomposing to produce the sufficient amount of silicon element at a second temperature below 1000 degrees Celsius; 2) reacting the sufficient amount of the at least one silicide-forming metal element with the sufficient amount of silicon element; and 3) forming the at least one silicide coating layer.

Figure 15:
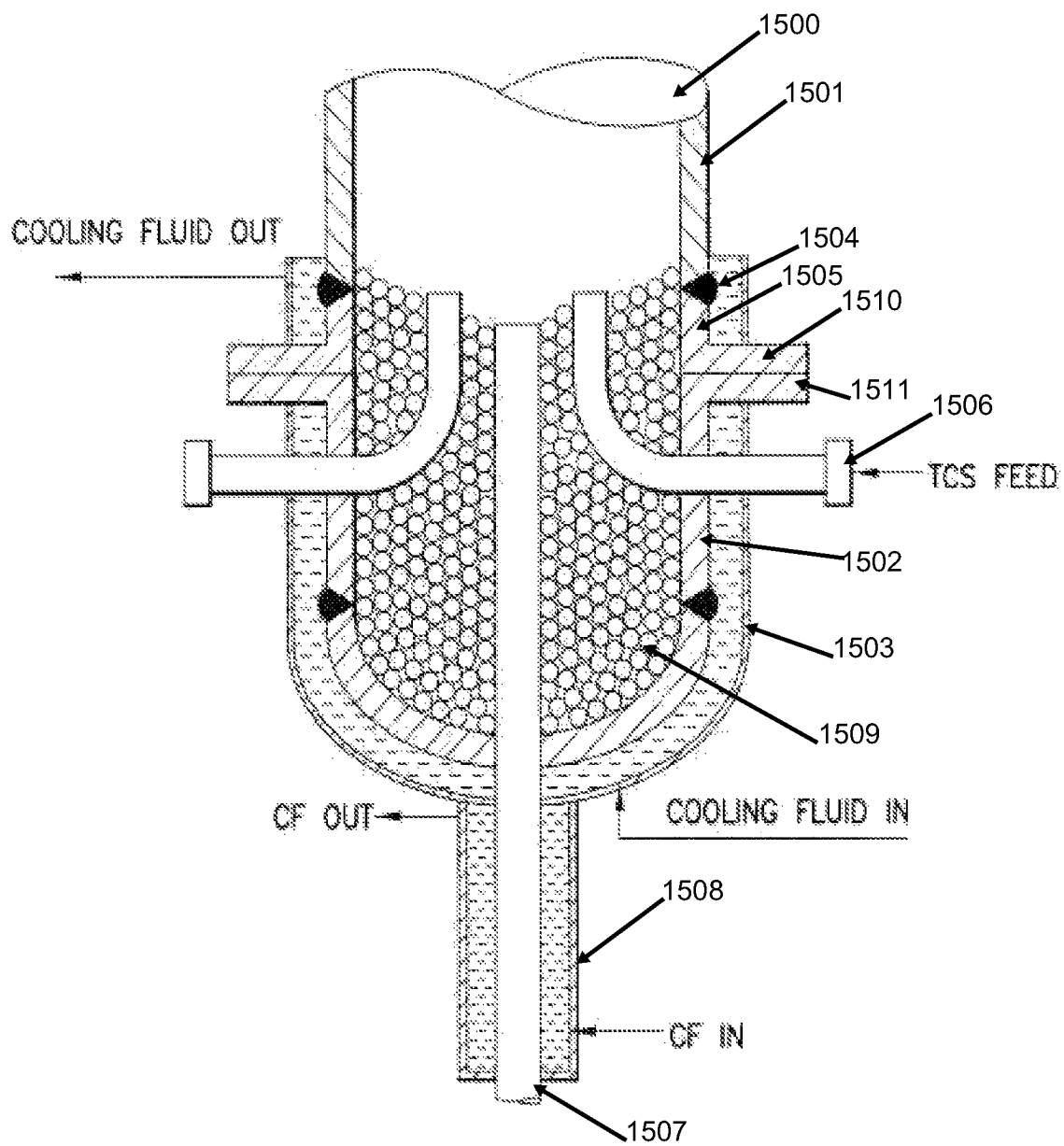
FIG. 15 shows a portion of a reactor constructed in accordance with an embodiment of the present invention.

In one embodiment and as shown in FIG. 15, a multi-sectional reactor 1500 is constructed from at least two sections. A first section 1501 of the reactor 1500, a reaction zone, is constructed from a silicide-forming material in accordance with any previously discussed embodiments of the invention. The reaction zone section 1501 of the reactor 1500 is then coated with a protective coating in accordance with any previously discussed embodiments of the invention. In another embodiment, a second section 1502, a bottom portion of the reactor 1500, is constructed from a stainless steel material so as to facilitate bottom flanged access to the reactor 1500. In one embodiment, an alloy material 1 (such as, but not limited to, the nickel-chrome-cobalt alloy described elsewhere in this application as HR-160) is utilized in the construction of the wall elements of at least a portion of the reaction zone 1501 of the reactor 1500. Stainless steel material 2 may be utilized in the construction of the bottom portion 1502 of the reactor 1500.

In one embodiment, the wall structure of the reaction zone 1501 is welded at an interface 1504 to a wall element 1505 having a first flange lip 1510 and is constructed from the same or similar material as the bottom portion 1502 of the reactor 1500. In one embodiment, the bottom portion 1502 of the reactor 1500 has a second flange lip 1511 that is attached to the first flange lip 1510 of the wall element 1505, allowing for a convenient access to the inside of the reactor 1500 when the bottom part 1502 is removed. In one embodiment, the second flange lip 1511 is attached to the first flange lip 1510 in any suitable manner that withstands internal pressures and preserves the integrity of the reactor's confinement during its operation.

In particular, use of the stainless steel material 2 or other material permitting the flanged access to the bottom 1502 of the reactor 1500 may facilitate access to the interior of the reactor 1500 for a variety of purposes. In one embodiment, an access 1506 for introduction and/or removal of, for example, silicon source gases is provided. In another embodiment, an access for introduction and/or removal of cooling fluid from water jackets 1503, 1508 is provided. In another embodiment, an access 1507 for introduction and/or removal of, for example, polysilicon coated beads is provided.

In another embodiment, use of an inert material 1509 is taught wherein the inert material 1509 is placed in the bottom of the reactor 1500 so as to form an at least partial physical barrier between the stainless steel portion 1502 of the reactor's walls and the introduced silicon source gases. In one embodiment, the inert material 1509 is a material that doesn't participate in the TCS thermal decomposition reaction or doesn't interact with any of the by-products of the reaction. In another embodiment, the inert material 1509 is a material that doesn't conduct in any substantial way heat (thermal conductivity is less than 100 BTU/(lb*° F.) (6.3 W/(m*K)) from the reaction zone of the reactor 1500. In another embodiment, the inert material 1509 is a material that doesn't react in any substantial way with chemicals (e.g. Cl, HCl, TCS, STC, etc.) that may be present in the reaction zone of the reactor 1500. In another embodiment, the inert material 1509 is a material that serves as an environmental barrier, substantially protecting material 2 from corrosion (providing at least 90% mitigation effect) that material 2 would otherwise experience when subject to the environment of the reaction zone.

In one embodiment, the inert material 1509 utilized is a ceramic material. In another embodiment, the inert material 1509 utilized is a cast alumina material. In another embodiment, the inert material 1509 utilized is any material capable of reducing incidence and/or severity of a stainless steel or other material permitting flanged access to the reactor when a silicon source gas and/or other nucleophilic or corrosive material is introduced into the reactor 1500. In one embodiment, the inert material 1509 is selected from any material or combination of same, including zirconium oxide; silicon nitrate; silicon carbide; silicon oxide; and/or aluminum oxide.

In another embodiment, the inert material 1509 is spherical in shape. In another embodiment, the inert material 1509 is tubular in shape.

Figure 16:
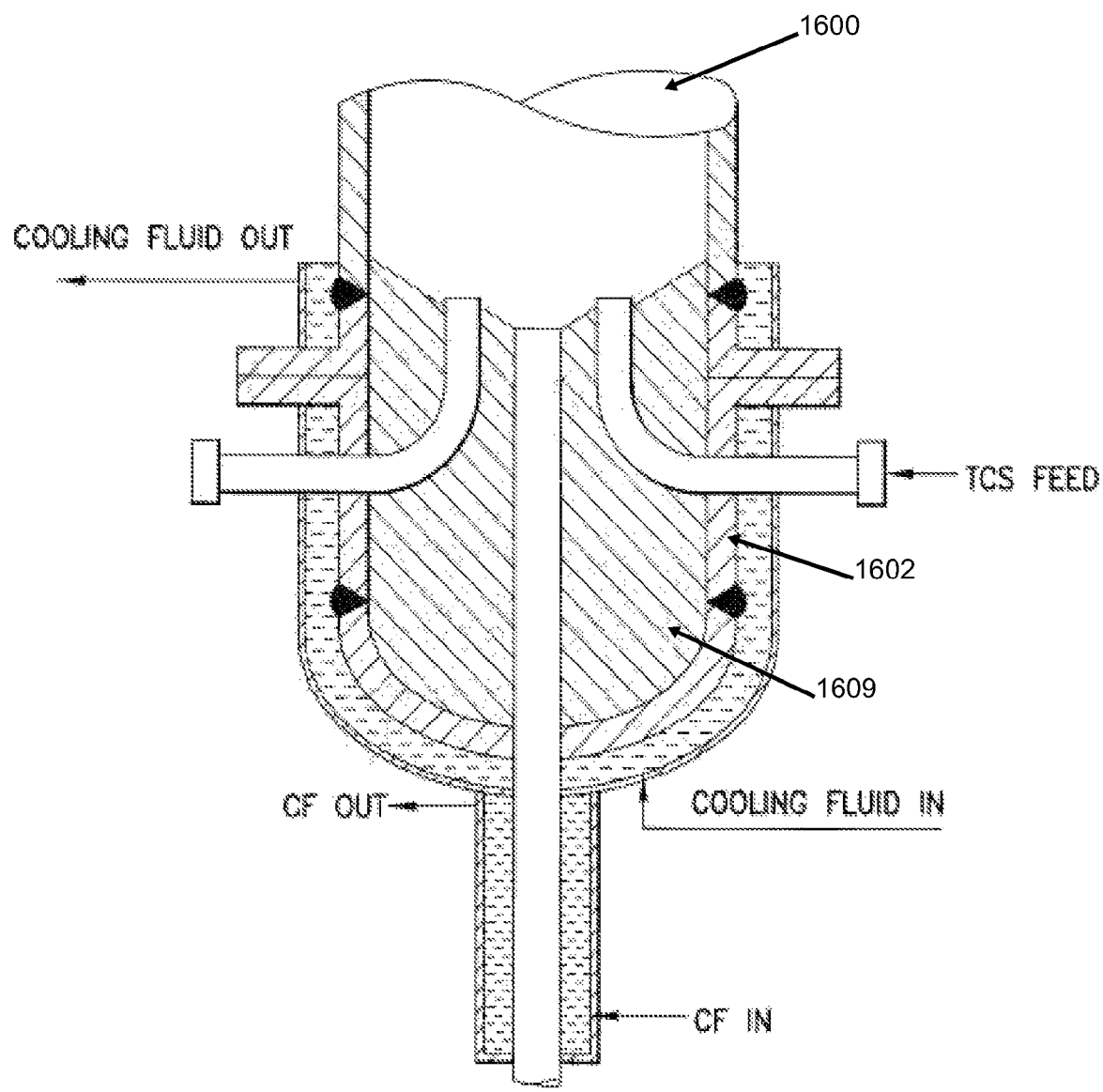
FIG. 16 shows a portion of a reactor constructed in accordance with an embodiment of the present invention.

In another embodiment, as shown in FIG. 16, the inert material 1609 is a cast insert placed within the stainless steel portion 1602 of the reactor 1600. In another embodiment, the inert material 1609 is a cast insert made from a ceramic material or another similar material.

Figure 17:
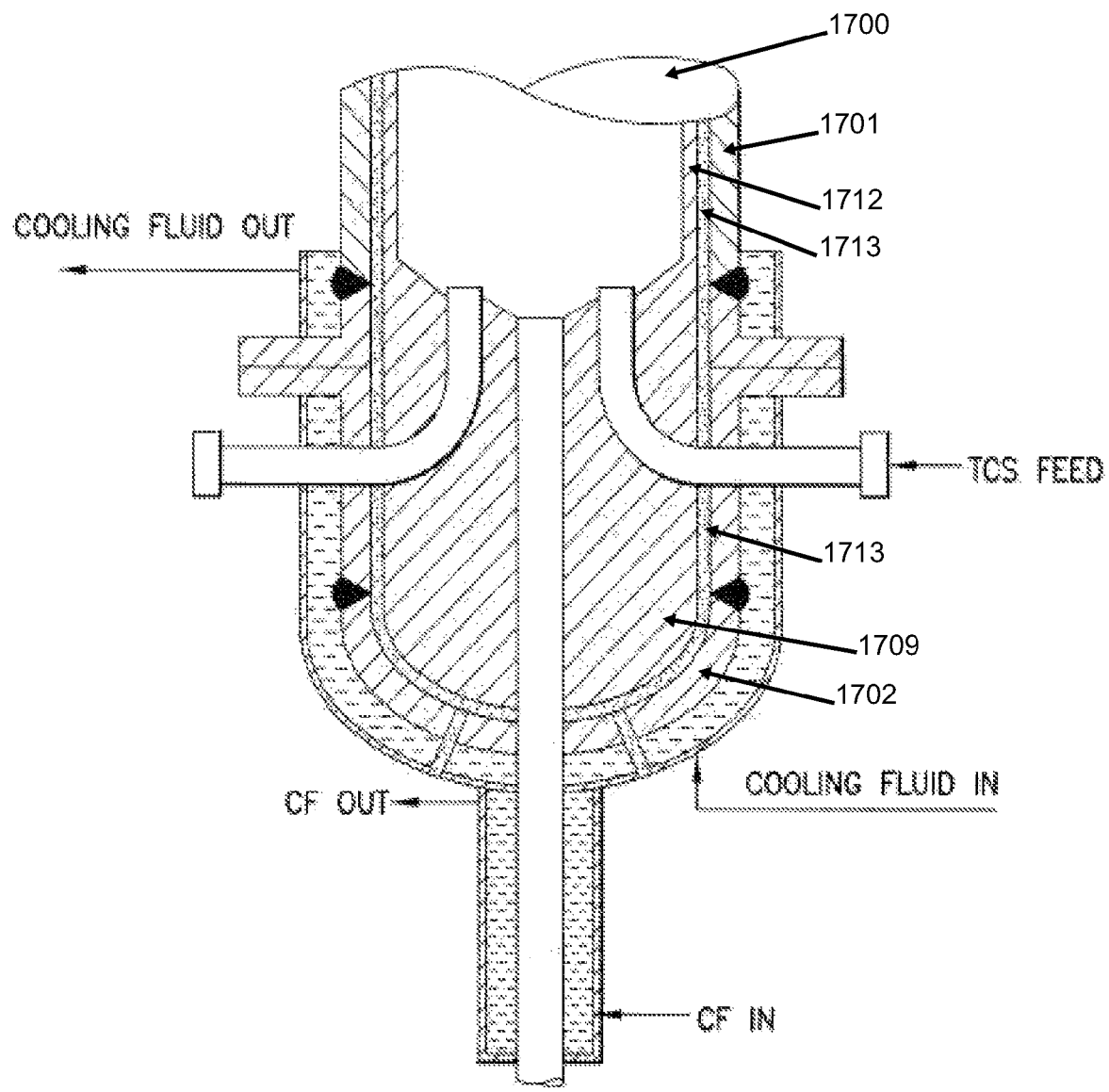
FIG. 17 shows a portion of a reactor constructed in accordance with an embodiment of the present invention.

In another embodiment, as shown in FIG. 17, the inert material 1709 is a cast insert placed within the stainless steel portion 1702 of the reactor 1700, with optional hydrogen gas in a space 1713 present between the stainless steel 1702 and cast 1709 portions so as to prevent infiltration of silane and other corrosive materials. In another embodiment, the inert material 1709 is used as a physical coating of the stainless steel bottom portion 1702 of a reactor's 1700 wall component. In another embodiment, the inert material 1709 is an insert 1709 which transitions into a liner 1712 that encircles at least a portion of the reaction zone 1701 of the reactor 1700. In another embodiment, an optional suitable gas is circulated in a space 1713 between the liner 1712, the cast insert 1709, and the wall (at least a portion the reaction zone 1701, the bottom section 1702) of the reactor 1700. In another embodiment, an optional hydrogen gas is circulated in a space 1713 between the liner 1712, the cast insert 1709, and the wall (at least a portion the reaction zone 1701, the bottom section 1702) of the reactor 1700.

In another embodiment, the inert material is utilized as a grid material, which may itself optionally be placed within the interior volume of the reactor. In another embodiment, the reactor wall is further jacketed so as to provide for appropriate temperature management.

In another embodiment, the flanged access points provide for ingress and egress of materials (for example, silicon source gases and/or cooling fluids) at a point above where the inert material contained within the reactor is in contact with the stainless steel (or other material permitting use of flanged access points) used in the construction of the bottom portion of the reactor.

While a number of embodiments of the present invention have been described, it is understood that these embodiments are illustrative only, and not restrictive, and that many modifications and/or alternative embodiments may become apparent to those of ordinary skill in the art. For example, any steps may be performed in any desired order (and any desired steps may be added and/or any desired steps may be deleted). Therefore, it will be understood that the appended claims are intended to cover all such modifications and embodiments that come within the spirit and scope of the present invention.

We claim:

1. A reactor for producing polysilicon, comprising:
    a first section, wherein at least a portion of the first section has a first composition that comprises:
        i) at least one first layer, wherein the at least one first layer consists essentially of:
            at least 37 wt. % nickel and
            the balance being at least one other metal element;
        ii) at least one second layer, wherein one layer of the at least one second layer directly contacts one layer of the at least one first layer and the at least one second layer comprises a silicide coating layer; and
        iii) at least one third layer, wherein one layer of the at least one third layer contacts one layer of the at least one second layer, and the at least one third layer comprises a silicon layer produced from a deposition of silicon element from halogenated silicon source gases within the reactor;
    a second section, wherein the second section is constructed from a second composition and wherein the first and the second compositions are different;
    an inert material, wherein the inert material occupies the second section of the reactor,
    wherein the second section comprises:
        i) a top portion having a first end and a second end, wherein the second end of the top portion has a first lip and wherein the first end is attached to the portion of the first section of the reactor;
        ii) a bottom portion having a first end and a second end, wherein the second end of the bottom portion forms the bottom of the reactor and wherein the first end of the bottom portion has a second lip; and wherein the first lip and the second lip are designed to securely attach to each other.

2. The reactor for producing polysilicon of claim 1, wherein the reactor further comprises a liner, wherein the liner extends from the inert material into the top portion of the second section.

3. The reactor for producing polysilicon of claim 2, wherein there is a space between the liner and a wall of the reactor to allow for an introduction of a non-silicon source gas.

* * * * *